United States Patent
Chiba et al.

(10) Patent No.: US 8,509,252 B2
(45) Date of Patent: Aug. 13, 2013

(54) COMMUNICATION SYSTEM, NODE, CONTROL SERVER, COMMUNICATION METHOD AND PROGRAM

(75) Inventors: Yasunobu Chiba, Tokyo (JP); Hideyuki Shimonishi, Tokyo (JP); Yusuke Shinohara, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 13/176,628

(22) Filed: Jul. 5, 2011

(65) Prior Publication Data
US 2012/0008629 A1    Jan. 12, 2012

Related U.S. Application Data

(63) Continuation of application No. PCT/JP2009/066026, filed on Sep. 14, 2009.

(51) Int. Cl.
*H04L 12/28* (2006.01)
(52) U.S. Cl.
USPC ............ 370/401; 370/254; 370/392; 370/428
(58) Field of Classification Search
None
See application file for complete search history.

(56) References Cited

U.S. PATENT DOCUMENTS

| | | | |
|---|---|---|---|
| 6,888,847 B2 | 5/2005 | Ueno | |
| 8,108,554 B1* | 1/2012 | Masters | 709/245 |
| 2002/0191607 A1 | 12/2002 | Galand et al. | |
| 2003/0026268 A1* | 2/2003 | Navas | 370/400 |
| 2004/0105385 A1 | 6/2004 | Galand et al. | |
| 2006/0155834 A1 | 7/2006 | Levy et al. | |
| 2006/0168316 A1 | 7/2006 | Kabashima et al. | |
| 2008/0008202 A1* | 1/2008 | Terrell et al. | 370/401 |
| 2008/0232385 A1 | 9/2008 | Suemura et al. | |

FOREIGN PATENT DOCUMENTS

| | | |
|---|---|---|
| JP | 2002-44126 A | 2/2002 |
| JP | 2003-23463 A | 1/2003 |
| JP | 2004-289794 A | 10/2004 |
| JP | 2006-513671 A | 4/2006 |
| JP | 2007-53789 A | 3/2007 |
| JP | 2008-236652 A | 10/2008 |

OTHER PUBLICATIONS

David L. Tennenhouse et al., "A Survey of Active Network Research", IEEE Communications Magazine, vol. 35, No. 1, pp. 80-86, Jan. 1997.
IETF, RFC791, "Internet Protocol", Darpa Internet Program, Protocol Specification, Sep. 1981.
Nick McKeown et al., "OpenFlow Enabling Innovation in Campus Networks", [online], [Retrieved on Aug. 27, 2009], Internet (URL?http://www.openflowswitch.org//documents/openflow-wp-latest.pdf).
"OpenFlow Switch Specification" Version 0.9.0. (Wire Protocol 0x98) [Retrieved on Aug. 27, 2009] Internet (URL:http://www.openflowswitch.org/documents/openflow-spec-v0.9.0.pdf).

* cited by examiner

*Primary Examiner* — Duc C Ho
(74) *Attorney, Agent, or Firm* — McGinn IP Law Group, PLLC

(57) ABSTRACT

A packet contains an array of processing operations that are to be performed by a node of a data forwarding network. Each node in a data forwarding network receiving performs the processing it has to the packet and perform in accordance with the array of the processing operations contained in the packet.

1 Claim, 29 Drawing Sheets

FIG. 5

| DPID | Flow Key | Actions |
|---|---|---|
| 1 | A | Output to Port #9 by DPID 1<br>Output to Port #6 by DPID 2<br>Output to Port #1 by DPID 3 |
| 3 | B | Output to Port #7 by DPID 3<br>Output to Port #4 by DPID 2<br>Output to Port #3 by DPID 1 |
| 1 | N | Output to Port #2 by DPID 1<br>Output to Port #5 by DPID 2<br>Output to Port #9 by DPID 3 |
| | | . . |

FIG. 21

| DPID | Flow Key | Actions |
|---|---|---|
| 1 | A | 0x02 by DPID 1<br>0x01 by DPID 2<br>0x0A by DPID 3 |
| 3 | B | 0x05 by DPID 3<br>0x02 by DPID 2<br>0x03 by DPID 1 |
| 1 | N | 0x09 by DPID 1<br>0x08 by DPID 2<br>0x07 by DPID 3 |
| | | .. |

FIG. 29 (RELATED ART)

| ACTION NAMES | CONTENTS OF ACTIONS |
|---|---|
| OUTPUT | OUTPUT TO SPECIFIED PORT |
| SET_VLAN_VID | ADD OR UPDATE VLAN TAG WITH SPECIFIED VLAN ID |
| SET_VLAN_PCP | ADD OR UPDATE VLAN TAG WITH SPECIFIED VLAN PRIORITY |
| STRIP_VLAN | REMOVE IEEE802.1Q VLAN TAG |
| SET_DL_SRC | UPDATE MAC SOURCE ADDRESS (SA) |
| SET_DL_DST | UPDATE MAC DESTINATION ADDRESS (DA) |
| SET_NW_SRC | UPDATE IP SOURCE ADDRESS (SA) |
| SET_NW_DST | UPDATE IP DESTINATION ADDRESS (DA) |
| SET_TP_SRC | UPDATE TCP/UDP SOURCE PORT |
| SET_TP_DST | UPDATE TCP/UDP DESTINATION PORT |
| VENDOR | VENDOR DEFINED ACTION |

COMMUNICATION SYSTEM, NODE, CONTROL SERVER, COMMUNICATION METHOD AND PROGRAM

REFERENCE TO RELATED APPLICATION

This application is a continuation of International Application No. PCT/JP2009/066026, filed on Sep. 14, 2009, the disclosure of which is incorporated herein in its entirety by reference thereto.

TECHNICAL FIELD

This invention relates to a communication system, a node, a control server, a communication method and a machine-readable storage medium storing a program. More particularly, it relates to a communication system, a node, a control server, a communication method and machine-readable storage medium storing a program that forwards a packet via nodes arranged in a network for realization of communication.

BACKGROUND

As a technique that allows a program to be run on nodes, such as routers or switches, arranged on a network, there is known an active network (see Non-Patent Document 1). There is disclosed in Patent Document 1 an active network provided with a signaling control unit which, by advance signaling, arrays an active code in a network's node.

In Patent Document 2, there is disclosed an optical communication system in which an integrated service class may be applied in different packet rings for packet flows being forwarded through the different packet rings. A node device of the optical communication system extracts the inter-ring service class information contained in the inter-ring header information appended to a packet incoming from another packet ring. Based upon the so extracted inter-ring service class information, the node device refers to a table that has recorded the relationship of correspondence between the inter-ring service class and the intra-ring service class, as set between the packet rings, in order to decide on the intra-ring service class to be set for the incoming packet. The node device appends the intra-ring header information, inclusive of the so determined intra-ring service class information, to the incoming packet.

On the other hand, a technique termed "source routing" is known as a system that exercises route control in say an IP network. As set out in Non-Patent Document 2, the source routing is implemented by specifying an IP address of a relaying router.

In these days, a technique termed "OpenFlow" has been proposed, as indicated in Non-Patent Document 3. In Open-Flow, communication is grasped as end-to-end flow, and route control, restoration from malfunctions, load distribution and optimization are accomplished on the flow basis. An OpenFlow switch, operating as a forwarding node, includes a secure channel for communication with an OpenFlow controller, and is run in accordance with a flow table to which a command for addition or rewrite is given from time to time from an OpenFlow controller. In the flow table, a set of rules (FlowKey), matched to a packet header, actions (Actions) that defines contents of the processing operation and the flow statistic Information (Stats) are defined from one flow to another (see FIG. 6).

FIG. 29 illustrates action names and contents of actions defined in Non-Patent Document 4. OUTPUT is an action for outputting to a specified port (interface). SET_VLAN_VID down to SET_TP_DST are actions that modify the fields of a packet header.

For example, the OpenFlow switch retrieves (looks up), on receipt of a first packet, an entry having a rule (FlowKey) matched to the header information of the received packet from the flow table. If, as a result of retrieval (lookup), an entry that fits with the packet received is found, the OpenFlow switch performs the contents of the processing operation, as set out in an action field of the entry, on the packet received. If, conversely, an entry that fits with the packet received is not found, the OpenFlow switch forwards the received packet over a secure channel to the OpenFlow controller to request the OpenFlow controller to decide on a route for the received packet based upon the source as well as the destination of forwarding of the received packet. The OpenFlow switch then receives a flow entry that implements the communication, while updating the flow table.

Patent Document 1:
JP Patent Kohyo Publication No. JP-P2006-513671A
Patent Document 2:
JP-Patent Kokai Publication No. JP-P2008-236652A

NON-PATENT DOCUMENT

Non-Patent Document 1:
David L. Tennenhouse et al., "A Survey of Active Network Research" IEEE Communications Magazine, Vol. 35, No. 1, pp. 80-86, January 1997
Non-Patent Document 2:
IETF, RFC791, "INTERNET PROTOCOL'
Non-Patent Document 3:
Nick McKeown et al., "OpenFlow Enabling Innovation in Campus Networks", [online], [Retrieved on Aug. 27, 2009], Internet (URL: http://www.openflowswitch.org// documents/openflow-wp-latest.pdf)
Non-Patent Document 4:
"OpenFlow Switch Specification" Version 0.9.0. (Wire Protocol Ox98) [Retrieved on Aug. 27, 2009] Internet (URL: http://www.openflowswitch.org/documents/openflow-spec-v0.9.0. pdf)

SUMMARY

It should be noted that the contents disclosed in Patent Documents 1-2 and Non-Patent Documents 1-4 are hereby incorporated by reference herein in their entirety.

The following is an analysis of the related techniques by the present invention.

In the OpenFlow technique of Non Patent Document 3, it is necessary to arrange a flow table in each switch and to re-write the flow table from time to time. The flow table allows the processing contents dependent on flow characteristics to be selected and performed. If it is desired to intricately control the route or to assure high quality, then a number of entries equal to the number of the matching rules are needed in the flow table, thus possibly imposing much load on the switch and on the management by the controller.

With the active network system of Non-Patent Document 1 and Patent Document 1, it is possible to have a desired node perform a specified processing operation without using the above-mentioned flow table. However, if the OpenFlow technique is applied to a switch that exercises flow control as in Non-Patent Document 3, it is necessary to provide each switch with a program library or to have a program itself contained in the packet. If so, the characteristic of Non-Patent Document 3 of simplifying the control function of a node being forwarded in order to have the function concentrated in a controller to the utmost extent possible might eventually be lost.

In light of the above depicted status of the art, it is an exemplary feature of the present invention to provide an arrangement and a method whereby the number of tables per se or the number of entries in the table to be referenced in having each node perform the processing operation consistent with a received packet, may be reduced. It is noted that, in the arrangement or the method, the demand for simplifying the control function of the nodes arranged in the network also needs to be met.

In a first exemplary aspect, the present invention provides a communication system including a node for a packet in a data forwarding route of a data forwarding network. The packet has a header containing an array of a plurality of processing operations to be performed by the individual nodes on the forwarding route of a data forwarding network. The node performs the processing operations the node is to perform in accordance with the array of processing operations.

In a second exemplary aspect, the present invention provides a node for a packet, arranged in a data forwarding route of a data forwarding network. The packet has a header including an array of a plurality of processing operations to be performed by the individual nodes arranged in the data forwarding route of the data forwarding network. The node performs the processing operations that the node is to perform in accordance with the array of processing operations.

In a third exemplary aspect, the present invention provides a control server that creates an array of processing operations and sends the array of the processing operations to a node that has sent an input packet. The array of processing operations includes processing operations to be performed by individual nodes on the forwarding path of the data forwarding network. The control server creates the array of processing operations based on information contained in a header of the input packet received from the node arranged in the data forwarding network.

In a fourth exemplary aspect, the present invention provides a method for communication including appending to an input packet a header containing an array of processing operations to be performed by individual nodes on a forwarding route of a data forwarding network, and for each node on the forwarding route of the data forwarding network to perform the processing operation that the node has to perform in accordance with the array of the processing operations added to the input packet. The present method is coupled to a specific mechanical means in the form of a forwarding node including the data forwarding network.

In a fifth exemplary aspect, the present invention provides a computer program, tangibly embodied in a machine-readable storage medium, that may be run on a computer including the above mentioned node or the control server. The program may be recorded on a recording medium that may be read out by the computer. Viz., the present invention may be implemented as a computer program product. Also the computer program may be regarded as either a program product (i.e. manufacture) or a process embodying the data storage method (process), expressed in a program language.

Exemplary and meritorious effects of the present invention are summarized as follows.

According to the present invention, the number of tables per se or the number of entries in the table may be reduced, in performing a variety of processing operations, as the demand to simplify the control function of the node arranged in the network is met. The reason is that a header containing an array of a plurality of processing operations to be performed by the individual nodes on the forwarding route of the data forwarding network is appended to the input packet. The processing operations to be performed by the individual nodes on the forwarding route of the data forwarding network are designed to be performed in accordance with the array of the processing operations in the header appended to the input packet.

BRIEF DESCRIPTION OF THE DRAWINGS

FIG. 5 is a diagrammatic view showing an arrangement of a flow entry database 21 of the control server of the exemplary embodiment 1 of the present invention.

FIG. 21 is a diagrammatic view showing an arrangement of a flow entry database of a control server 20a of the exemplary embodiment 2 of the present invention.

FIG. 29 is a diagrammatic view for illustrating action names and contents of the actions.

DETAILED DESCRIPTION OF EXEMPLARY EMBODIMENTS OF THE PRESENT INVENTION

Initially, the outline of an exemplary embodiment of the present invention will be explained. A node of the communication system of the exemplary embodiments of the present invention has the function of identifying the processing operation to be performed by that node from an action array (an array of processing operations) in an action header appended to a received packet, and of performing the so identified processing operation.

Figure 1:
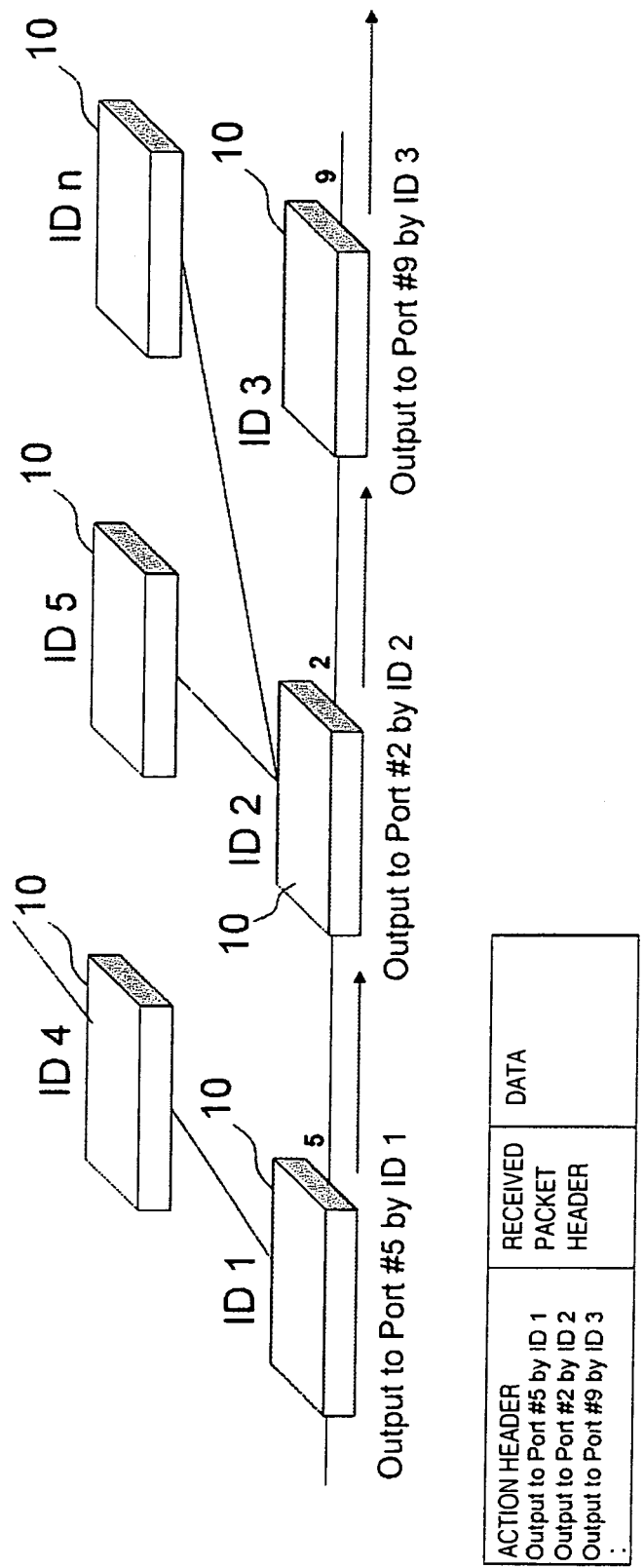
FIG. 1 is a schematic view for illustrating the schemata of the present invention.

The action header is an array of processing operations to be performed by the individual nodes arranged on a forwarding route of a data forwarding network. The individual actions may, for example, be defined by (1) an action of changing the communication destination/source IP address or communication destination/source MAC address in the header or VLAN Tag to specified values, (2) an action of dropping (discarding) a packet, or by (3) an action of outputting packets (Output) at a plurality of specified ports (interfaces) See FIG. 29 and pages 4 to 6 of Non-Patent Document 4, [3.3 Actions] and [Table 5]. In the Example of FIG. 1, the packet received is sent to a port #5 of a node ID=1, thence to a port #2 of a node ID=2, and thence to a port #3 of a node ID=3.

By appending an action header to a packet and outputting the resulting packet, the packet may sequentially be processed by specified nodes on the route. It is therefore unnecessary to send an action code to each node as in the case of the active network referred to in connection with the related technique. It is also unnecessary to carry out the processing of adding an entry to a flow table in each node on the route.

The action header may be appended to a packet by a node that initially received the packet. An action array (array of processing operations) in the action header may be acquired on inquiry at an external server. Or, a pre-stored action array (array of processing operations) may be embedded in a node. The action header may be deleted by a node which is a terminal node of the route.

Exemplary Embodiment 1

Figure 2:
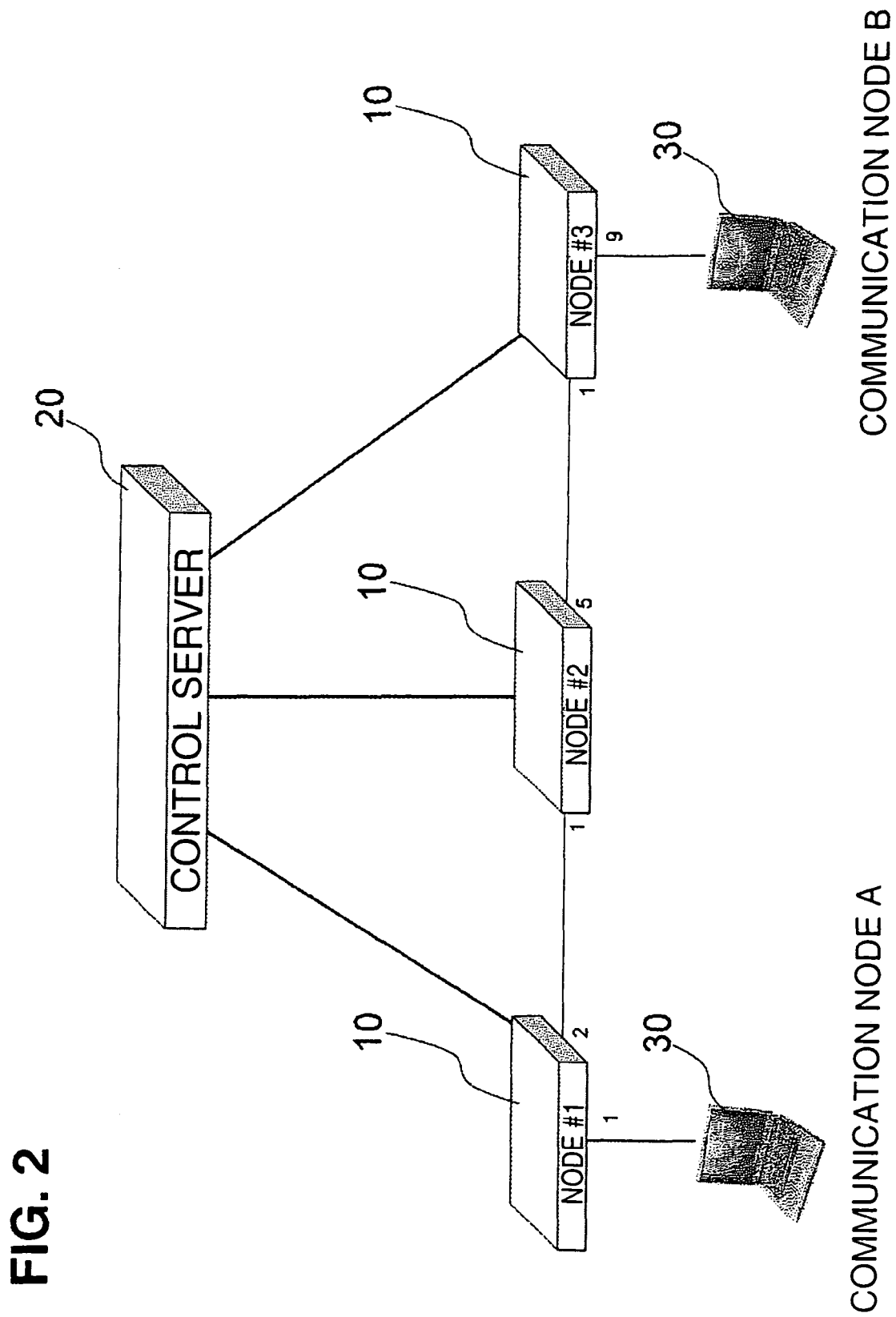
FIG. 2 is a schematic view for illustrating an arrangement of an exemplary embodiment 1 of the present invention.

An exemplary embodiment 1 of the present invention will now be described in detail with reference to the drawings. FIG. 2 shows a communication system according to an exemplary embodiment 1 of the present invention. Referring to FIG. 2, there are shown three nodes 10, a control server 20 and communication nodes 30 having communication with each other over the nodes 10. Although the example shown in FIG. 2 has the three nodes 10, the sole control server 20 and the two communication nodes 30, this is only by way of illustration, such that any suitable optional numbers of these entities may be used.

Figure 3:
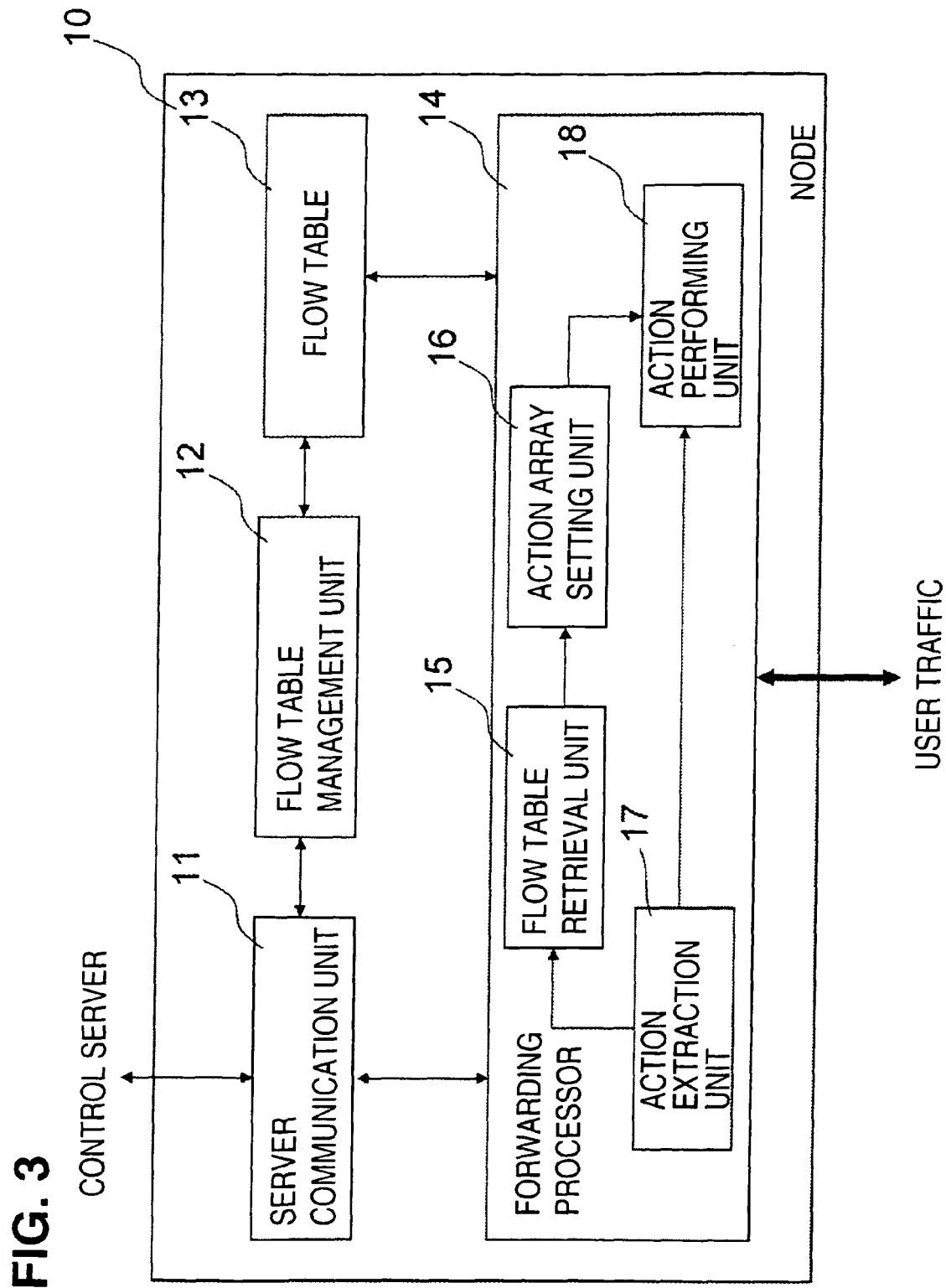
FIG. 3 is a block diagram showing a detailed arrangement of a node 10 of the exemplary embodiment 1 of the present invention.

FIG. 3 shows a detailed formulation of the node 10. Referring to FIG. 3, the node 10 includes a server communication unit 11 that has communication with the control server 20, a flow table management unit 12 that manages a flow table 13, and a forwarding processor 14.

The forwarding processor 14 includes an action extraction unit 17 that takes out the action the own node 10 has to perform, from an action header appended to a packet received as user traffic, and that outputs the action so taken out to an action performing unit 18. The forwarding processor 14 also includes a flow table retrieval (flow entry lookup) unit 15 that, in case the action header has not been appended to the packet received, retrieves (looks up) an entry from a flow table 13 to output the result to an action array setting unit 16. The forwarding processor 14 also includes the action array setting unit 16. The action array setting unit 16 appends the action array of the entry that has been retrieved by the flow table retrieval unit 15 and that is to be performed in a node other than the own node as action header to the received packet. The forwarding processor 14 also includes an action performing unit 18 that performs an action for the received packet, output from the action extraction unit 17, viz., the action to be performed by the own node (i.e., by the node itself). The action array setting unit 16 also performs the processing operation of inquiring at the control server 20 as to the action array that is to be appended if the result of lookup of the entry by the flow table retrieval unit 15 has indicated that there lacks the relevant entry.

The node 10 of the present invention may be implemented by a formulation in which the action extraction unit 17 and the action array setting unit 16 are added to the OpenFlow switch.

Figure 4:
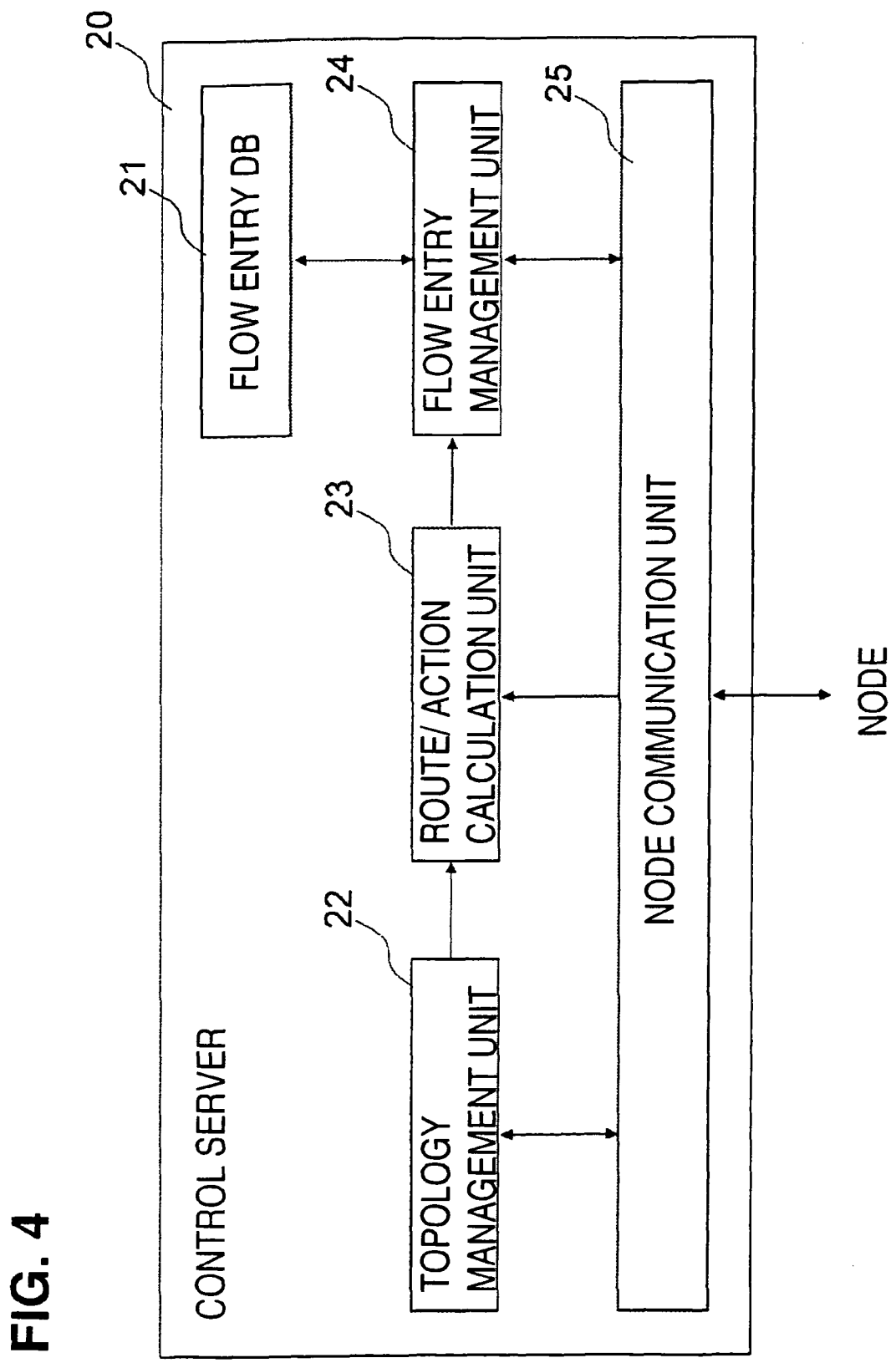
FIG. 4 is a block diagram showing a detailed arrangement of a control server 20 of the exemplary embodiment 1 of the present invention.

FIG. 4 shows an in-depth formulation of the control server 20. Referring to FIG. 4, the control server 20 includes a flow entry database (flow entry DB) 21 where flow entries are stored, and a topology management unit 22 that constructs the information on the network topology based upon the connection relationships of the nodes 10 as collected by a node communication unit 25. The control server 20 also includes a route/action calculation unit 23 that finds the packet forwarding route and the action array to be performed by the node 10 on the packet forwarding route based upon the information on the network topology constructed by the topology management unit 22. The control server 20 also includes a flow entry management unit 24 that registers the result calculated by the route/action calculation unit 23 as flow entry in the flow entry DB 21, and that also responds to the request for addition or update of the flow entry or entries from the node 10. The control server 20 further includes a node communication unit 25 that has communication with the node 10. It is noted that, if there is no necessity to save the flow entry that has instructed, addition or update to the node 10, the flow entry database (flow entry DB) 21 may be dispensed with. This flow entry database (flow entry DB) 21 may also be provided separately on, for example, an external server.

FIG. 5 shows exemplary entries to be stored in the flow entry DB 21. Referring to FIG. 5, each entry is made up of a DPID (data path ID), a FlowKey (a flow key or a matching key) and Actions (an action array). In the case of FIG. 5, an action array of 'Output to Port #9 by DPID 1/Output to Port

6 by DPID 2! Output to Port #1 by DPID 3' is appended to a packet matched to a FlowKey (flow key or matching key) labeled A.

Figure 6:
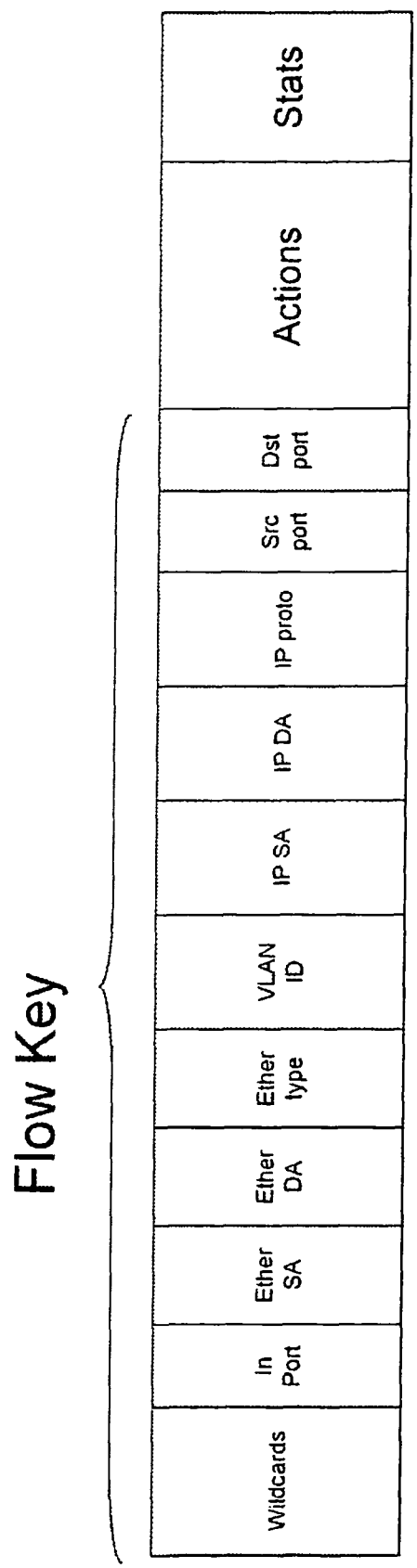
FIG. 6 is a diagrammatic view for illustrating a Flowkey (matching key) of FIG. 5.

FIG. 6 shows a field constitution of the FlowKey (matching key). For example, it is possible for the node 10, which has received a packet, whose destination address (IP DA) is a specified server, to perform an action defined in the field (variable length field) of Actions. In similar manner, the action defined in the field (variable length field) of Actions may be performed for a packet entered at a specified port (In port).

The control server 20 may be implemented by modifying the configuration of the flow entry DB 21 of the OpenFlow controller or the contents of the flow entry that commands addition or modification to the node 10.

Figure 7:
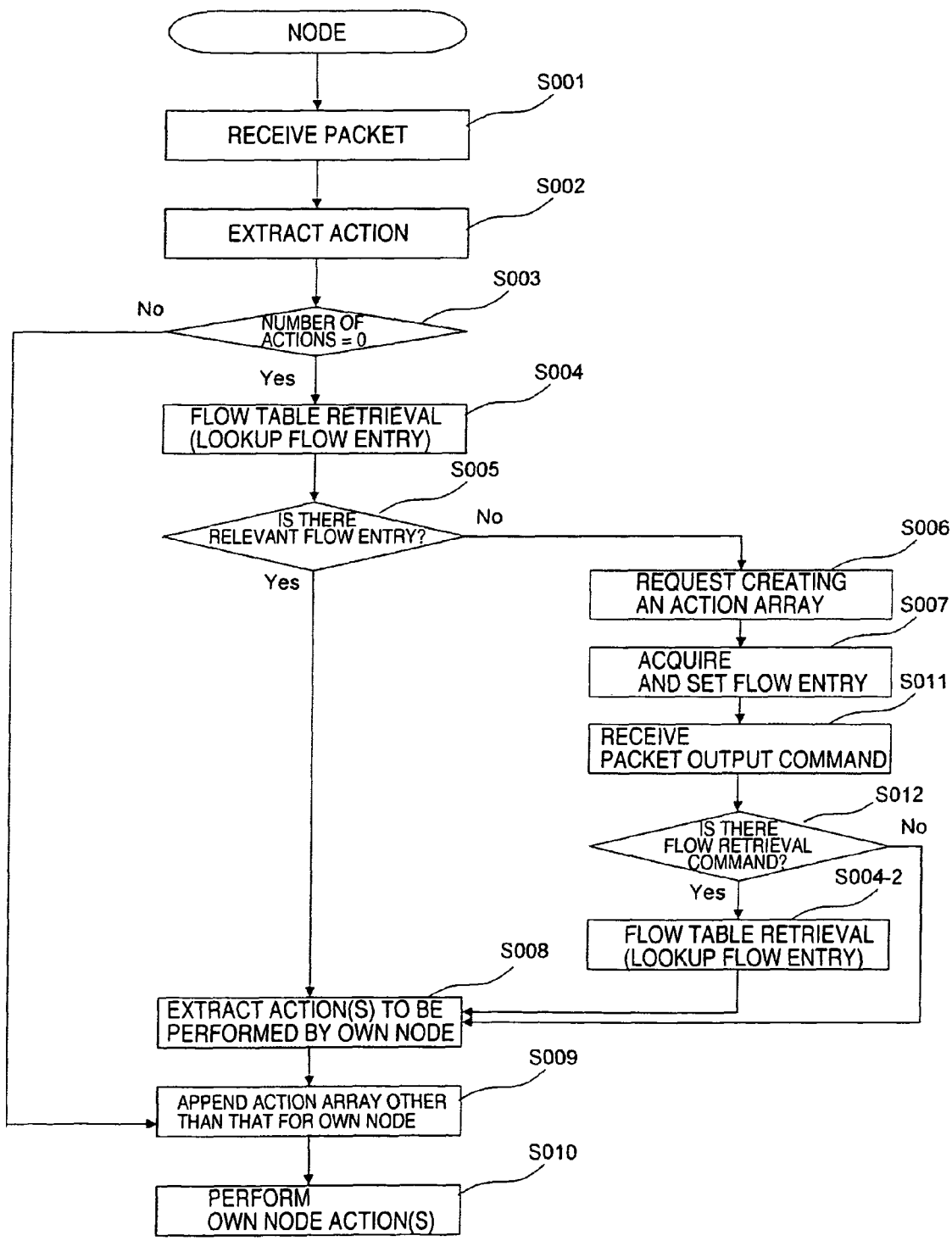
FIG. 7 is a flowchart for illustrating the operation of the node of the exemplary embodiment 1 of the present invention.

The operation of the node 10 and the control server 30 will now be explained. FIG. 7 depicts a flowchart showing the operation of the node 10. Referring to FIG. 7, the node 10 extracts, on receipt of the packet from the communication node 30 or the other node 10 (step S001), the action to be performed by the own node from the action header of the packet received (step S002).

If, as a result of action extraction, an action has been able to be extracted (No of step S003), then the node 10 performs the action to be performed by the own node 10 itself (step S009).

If, as a result of action extraction, no action has been able to be extracted (Yes of step S003), then the node 10 looks up a flow entry from the flow table 13 to check to see if there is any flow entry matched to the packet received (step S004).

If, as a result of retrieval (lookup) of a flow entry from the flow table 13, a flow entry, matched to the received packet, is found (Yes of step S005), then the node 10 extracts the action which the node 10 itself is to perform (step S008). The node appends the action array of the flow entry as found to the packet header of the received packet as action header (step S009). If the packet received is a packet next following a certain packet already registered in the flow entry DB 21, then extraction of the action to be performed by the node itself and creation of or addition to the action header are carried out using the result of retrieval (lookup) of a flow entry from the flow table 13, as set out above.

If, on the other hand, no flow entry matched to the packet received is found (No of step S005), then the node 10 sends the received packet in its entirety or in part to the control server 20 to request the latter to create an action array (step S006).

On receipt of the action array from the control server 20, the node 10 registers the flow entry received in the flow table 13 (step S007). The node 10 then receives a command to output a packet from the control server 20 (step S011). In case the command to output the packet is accompanied by a flow retrieval (lookup) command (Yes of step S012), the node 10 again searches if there is a flow entry that fits to the packet in question (step S004-2). The node 10 then extracts the action the node 10 itself is to perform (step S008), while appending the action array acquired as an action header to the packet header of the packet received (step S009). The same applies for a case where the command to output the packet is accompanied not by the flow retrieval command, but by an action to be performed on the packet, i.e., an action of appending the action array to the packet and one or more actions of outputting the resulting packet at a specified port. Viz., the node performs the processing operation of extracting an action on the node itself is to perform (step S008) and appending the action array acquired as action header to the received packet header in accordance with the action in question (step S009).

Finally, the node 10 performs the action the node itself is to perform (step S010).

Figure 8:
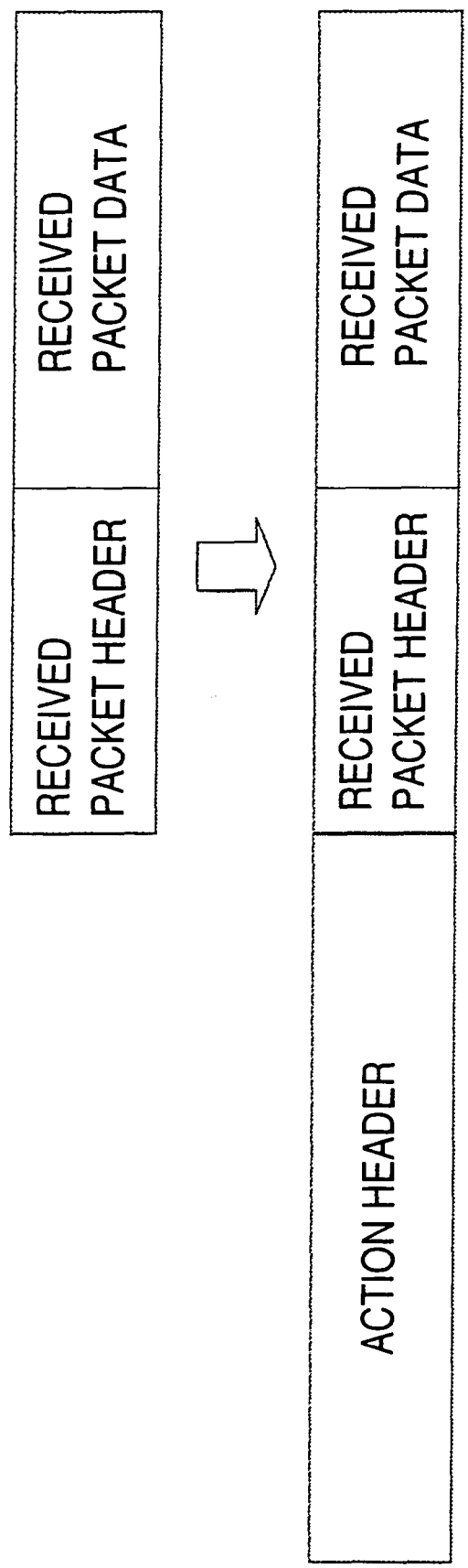
FIG. 8 is a diagrammatic view showing a mode of appendage of an action header (action array).

The method of appending the action array in the above step S009 will now be explained. In the present exemplary embodiment, it is premised that the action header is appended by adding the action header at the leading end of the received packet by way of encapsulation, as shown in FIG. 8. Such a method in which an action is embedded in a header of the received packet may also be used. This will be explained as an exemplary embodiment 3 later on.

Figure 9A:
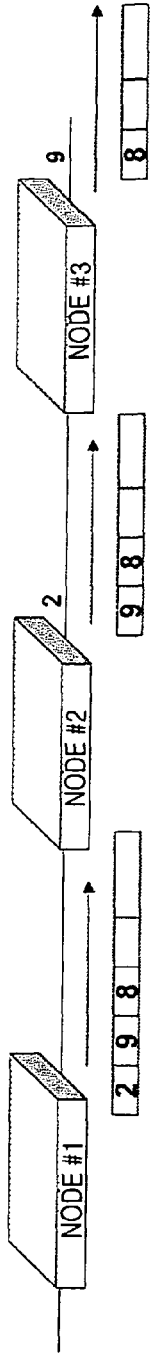
FIGS. 9A to 9D are schematic views for illustrating concrete modes of the action header (action array).
Figure 9B:
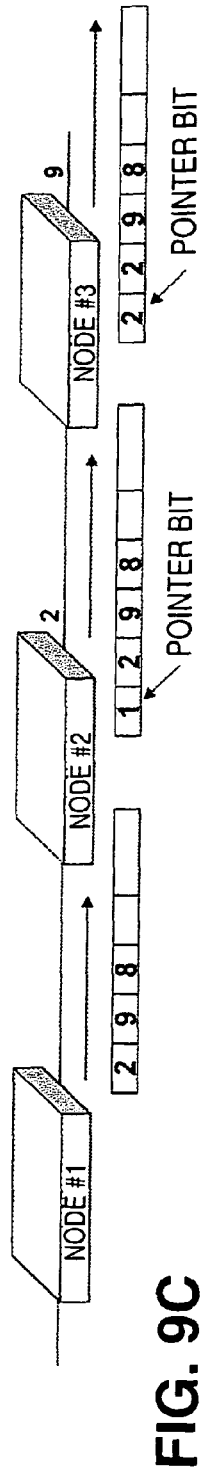

There is no particular limitation to the action array provided that it will allow each node 10 to identify the action each node is to perform. For example, the action array may be so formed that each node 10 will sequentially take out the action from the leading end, based upon an optional delimiter or a length field as separately provided, as shown in FIG. 9A. For example, each node 10 may perform the action, as the pointer bit at the leading end is incremented (added by one each time), as shown in FIG. 9B. In both of the cases of FIGS. 9A and 9B, node #2 forwards a packet from a port #2 to a node #3 of the next hop, while the node #3 forwards the packet from a port #9 to the next hop.

Figure 9C:
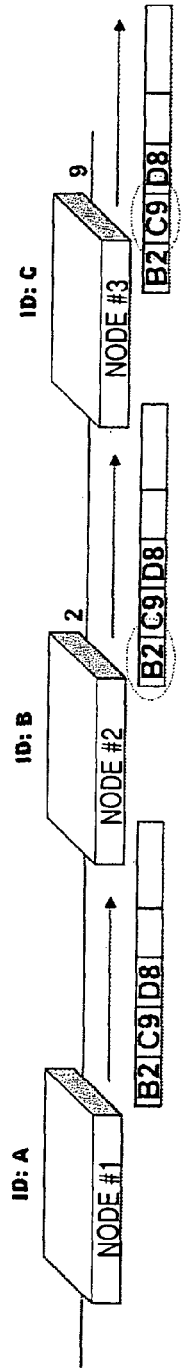

Such action array in which the ID of each node and the action to be performed are grouped together as a set, as shown in FIG. 9C, may also be used. In the case of FIG. 9C, the node #2 having an ID: B takes out 'B2' bearing the ID: B of the node #2 (own node) in the action header and forwards the packet from the port #2 to the node #3 of the next hop. The node #3, having an ID: C, takes out 'C9' bearing its ID: C in the action header, and forwards the packet from the port #9 to the next hop. In such an action array, it is unnecessary for the order of action statements to be coincident with the order of the nodes on the forwarding route. It is thus possible for each node 10 to identify the action that is to be performed in each node 10 (i.e., its own node) without the necessity to rewrite the action header each time.

Figure 9D:
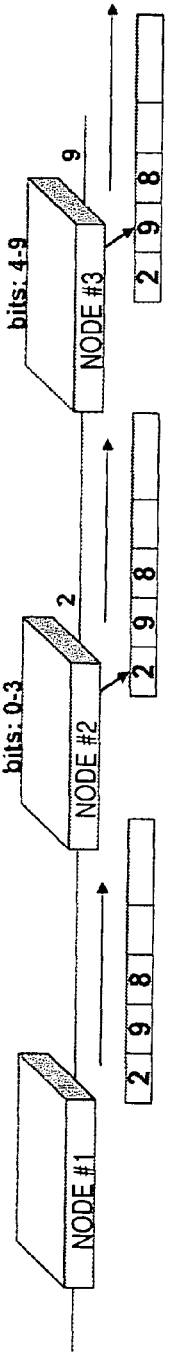

Such a method may also be used in which an area in the action header from which to take out the action is set for each node 10, as shown in FIG. 9D. In the case of FIG. 9D, the node #2, configured for taking out an action from bits 0 to 3 of the action header, takes out '2' to forward the packet to the node #3 of the next hop at a port #2. The node #3, configured for taking out an action from bits 4 to 9 of the action header, takes out '9' to forward the packet to the node #3 of the next hop at the port #9. In the case of such an action array, it is unnecessary for the order of the actions to be coincident with the order of the nodes on the forwarding route, such that each node 10 may identify the action to be performed in each node 10 without the necessity to rewrite the action header each time.

Figure 10:
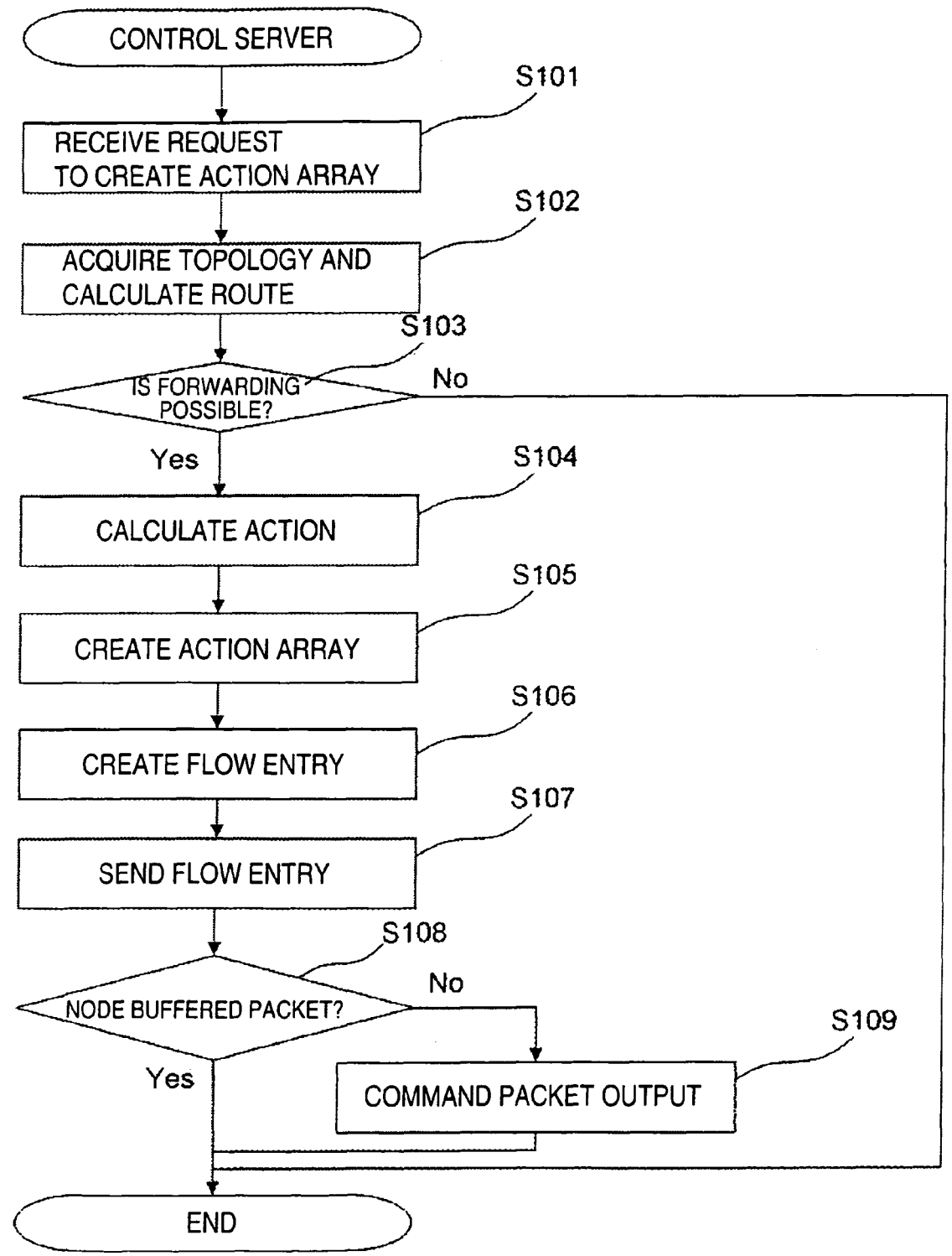
FIG. 10 is a flowchart for illustrating the operation of the control server of the exemplary embodiment 1 of the present invention.

FIG. 10 depicts a flowchart for illustrating the operation of the control server 20. Referring to FIG. 10, on receipt of the request to create an action array from the node 10 in a step S101, as in the step S006 of FIG. 7, the control server 20 acquires the information on the network topology constructed by the topology management unit 22, and calculates the packet forwarding route in a step S102.

The control server 20 calculates actions for the so calculated forwarding route, in a step S104, to create an action array in a step S105, except if the result of the calculations for the packet forwarding route indicates that forwarding is not possible due to node faults or to a route being unable to be formed (No of a step S103). If a route from the node 10 of DPID#1 to the node 10 of the DPID#2 and thence to the node 10 of the DPID#3 is sought, then an action array: 'Output to port #9 by DPID1/Output to port #6 by DPID2/Output to port #1 by DPID3' is created.

When the action array has been created, the control server 20 creates a FlowKey (matching key) to verify the matching of subsequent packets. The control server 20 then creates a flow entry in a step S106. In the flow entry, there are defined the information to the effect that the above-mentioned action array calculated is to be set in the packet received and the information regarding the action to be performed by the node that has received the packet. Finally, the control server 20 sends the flow entry to the node 10 of the source of request for the action array in a step S107 and commands the packet to be output in a step S109 in case the node 10 is not buffering a packet (No of a step S108). This packet output command is by specifying a packet to be output (packet received) and an action to be performed on the packet (processing operation of appending an action header to the packet and outputting the resulting packet at a port specified) or by commanding retrieval (lookup) of a flow entry from the flow table and the packet to be output (packet received). It is noted that, in case the node 10 is buffering the packet (Yes of step S108), packet forwarding is not made, as will be set out later with reference to FIGS. 13 and 14.

Figure 11:
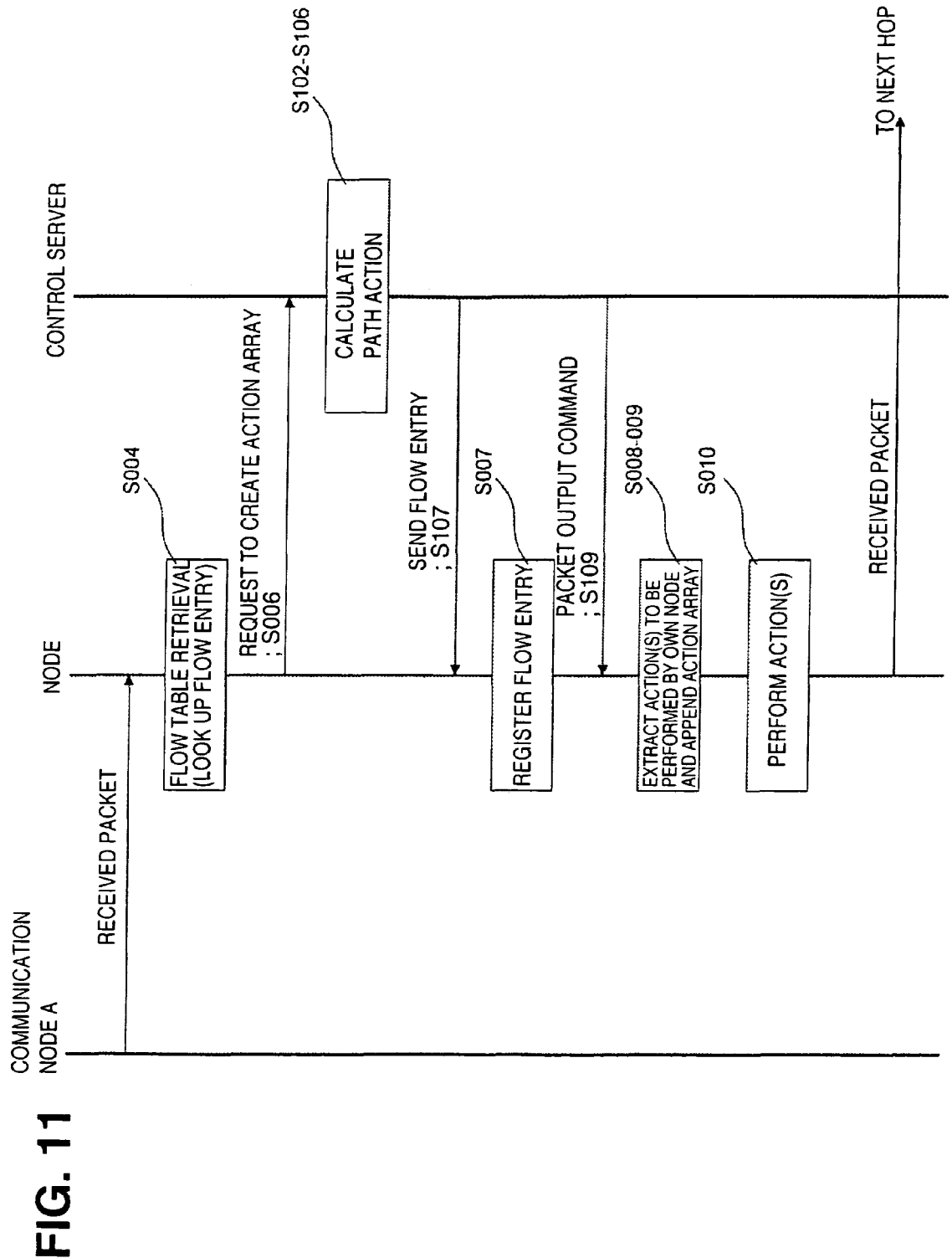
FIG. 11 is a schematic view for illustrating an operational sequence of a control server and a node (at the time of receiving a new flow) of the exemplary embodiment 1 of the present invention.

FIG. 11 depicts a sequence diagram showing the flow as from registering a new flow entry based upon a packet sent from a communication node A (received packet) until the packet (received packet) is forwarded to the next hop.

If the node 10 has verified that no action header has been appended to the received packet, then the node 10 retrieves (looks up) the flow entry from the flow table 13 in order to check to see whether or not the flow entry has already been created for the flow in question. This processing step is the same as the step S004 of FIG. 7. Since no relevant entry has been registered at this time point in the flow table 13, the node 10 requests the control server 20 to create an action array. This processing step is the same as the step S006 of FIG. 7.

On receipt of the request to create the action array, the control server 20 calculates the forwarding route for the received packet and the action array, as set out above. A flow entry bearing the information to the effect that the above-mentioned action array calculated is to be set in the packet received and the information regarding the action to be performed by the node that has received the packet is created. This processing step is the same as the steps S102 to S106 of FIG. 10.

The node 10 that has received the flow entry as set out above registers the flow entry in the flow table 13. This processing step is the same as the step S007 of FIG. 7.

If then the node 10 has received a packet output command from the control server 20, then the node 10 extracts the action to be performed by the node itself. This processing operation is the same as the step S008 of FIG. 7. The node then appends an action header to the packet received. This processing operation is the same as the step S009 of FIG. 7. The node then outputs the resulting packet at a port specified. This processing operation is the same as the step S010 of FIG. 7.

Figure 12:
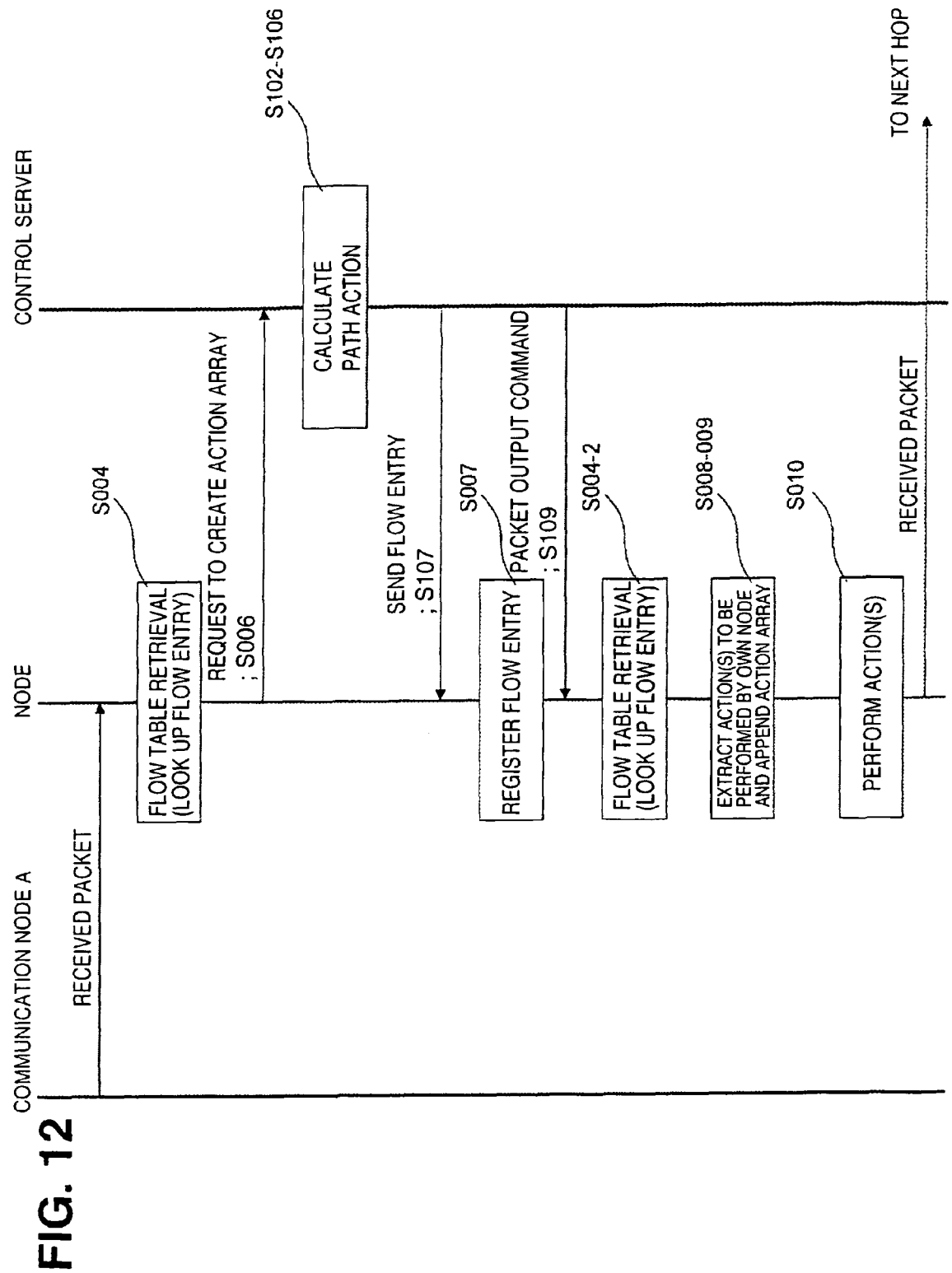
FIG. 12 is a schematic view for illustrating another operational sequence of a control server and a node (at the time of receiving a new flow) of the exemplary embodiment 1 of the present invention.

FIG. 12 is a modification of FIG. 11 as to the operational sequence. The operational sequence of FIG. 12 differs from that of FIG. 11 in that, when the control server 20 issues the packet output command in a step S109 of FIG. 10 after sending the flow entry, the control server 20 specifies the packet to be output (received packet), while commanding retrieval in the flow table (lookup of entry from the flow table) as an action.

On receipt of the command, the node 10 again retrieves (looks up) the flow entry from the flow table, using the received packet as a key (step S004-2 of FIG. 12). Since the flow entry has been registered in the previous step S007, the flow entry for the received packet is retrieved. The node 10 extracts, from the flow entry, the action the node 10 itself has to perform. This processing operation is the same as the step S008 of FIG. 7. The node 10 appends an action header to the received packet. This processing operation is the same as the step S009 of FIG. 7. The node 10 then outputs the resulting packet at a specified port. This processing operation is the same as the step S010 of FIG. 7.

Figure 13:
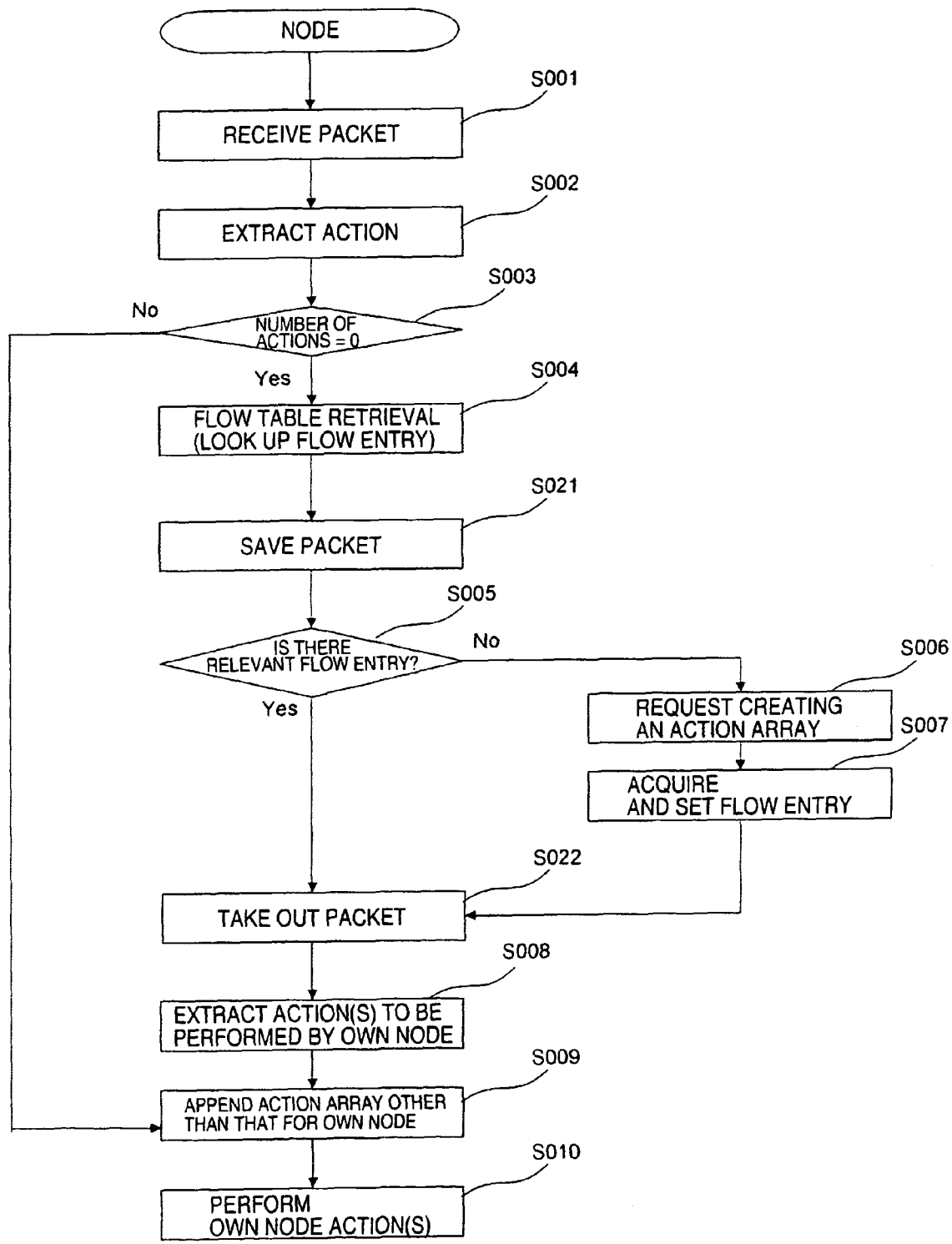
FIG. 13 is a flowchart for illustrating another example operation of a node (at the time of receiving a new flow) of the exemplary embodiment 1 of the present invention.
Figure 14:
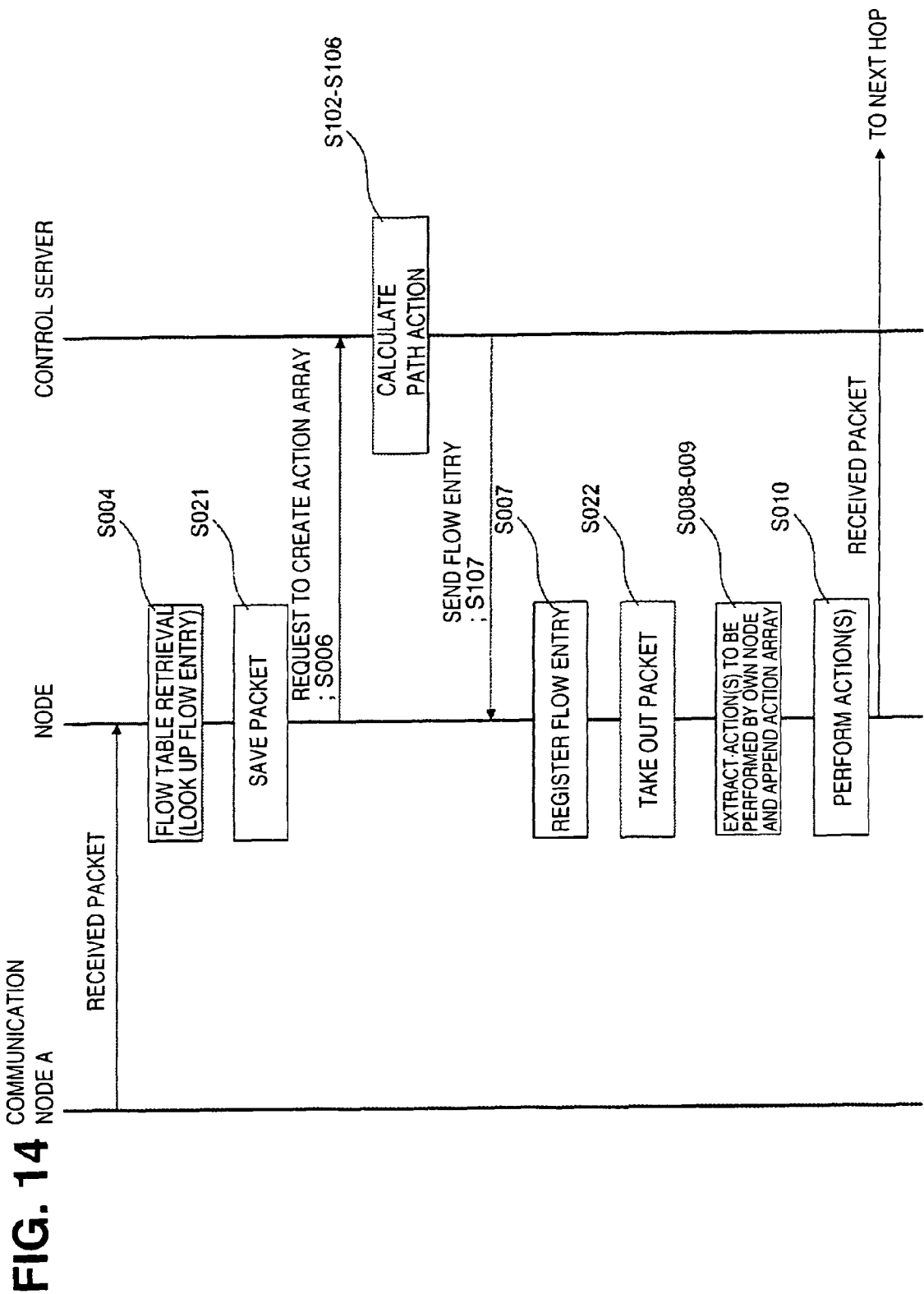
FIG. 14 is a schematic view for illustrating a further operational sequence of a control server and a node (at the time of receiving a new flow) of the exemplary embodiment 1 of the present invention.

In case the node 10 has a packet buffering function, the flowchart of FIG. 7 is replaced by the flowchart of FIG. 13, while the operational sequence of FIG. 11 is replaced by the sequence of FIG. 13. The flowchart of FIG. 13 and the operational sequence of FIG. 14 respectively differ from the flowchart of FIG. 7 and the operational sequence of FIG. 11 in the following points: Viz., in the flowchart of FIG. 13 and the operational sequence of FIG. 14, a packet saving processing operation (step S021) and a packet takeout processing operation (step S022) are newly added, and the packet output command from the control server 20 is dispensed with. In FIGS. 13 and 14, a buffer ID that has stored the received packet is attached to the request to create the action array from the node 10 to the control server 20. When the flow entry is sent to the node 10 from the control server 20, the buffer ID received is attached to the flow entry. After registering the flow entry (step S007), the node 10 takes out the received packet from the specified buffer ID (step S0022), while extracting the action the node 10 itself has to perform and appending the action header (steps S008 and S009). The node 10 then outputs the resulting packet at the specified port (step S010).

Figure 15:
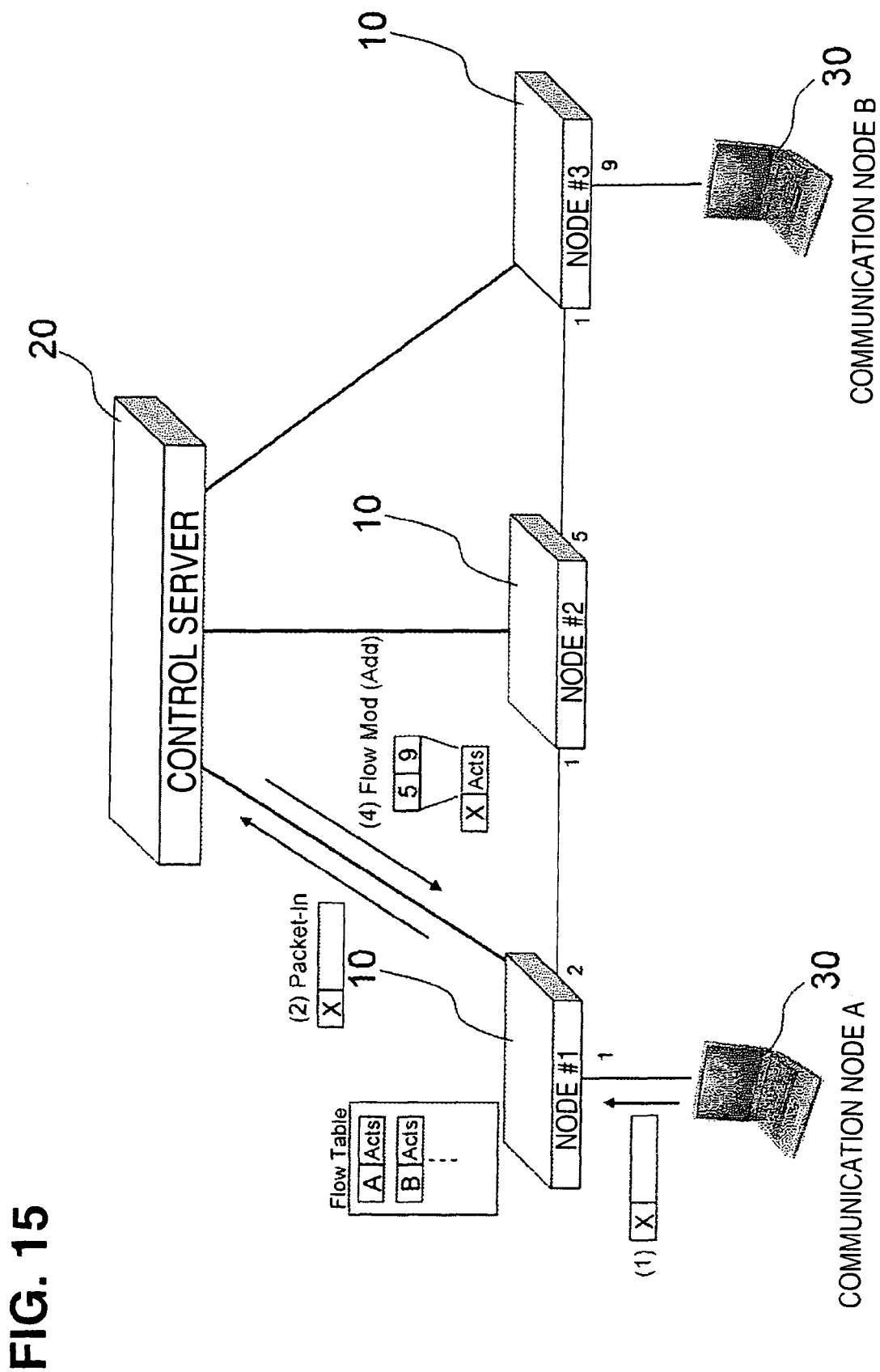
FIG. 15 is a schematic view for illustrating the global operation of the exemplary embodiment 1 of the present invention.

The sequence of operations, described so far, will now be explained in order with reference to FIGS. 15 to 17. The communication node A sends a packet having a header X to the communication node B ((1) of FIG. 15). A node #1 that has received the packet looks up a flow entry from its own flow table, however, there lacks a corresponding entry. Hence, the node #1 requests the control server 20 to create an action array coordinated to the packet ((2) Packet-In of FIG. 15).

The control server 20 creates a flow entry in which a proper matching key (X) and an action array (acts) coordinated to the packet sent from the node #1 are set. The control server then returns the so-created flow entry to the node #1 ((4) FlowMod (Add) of FIG. 15).

Figure 16:
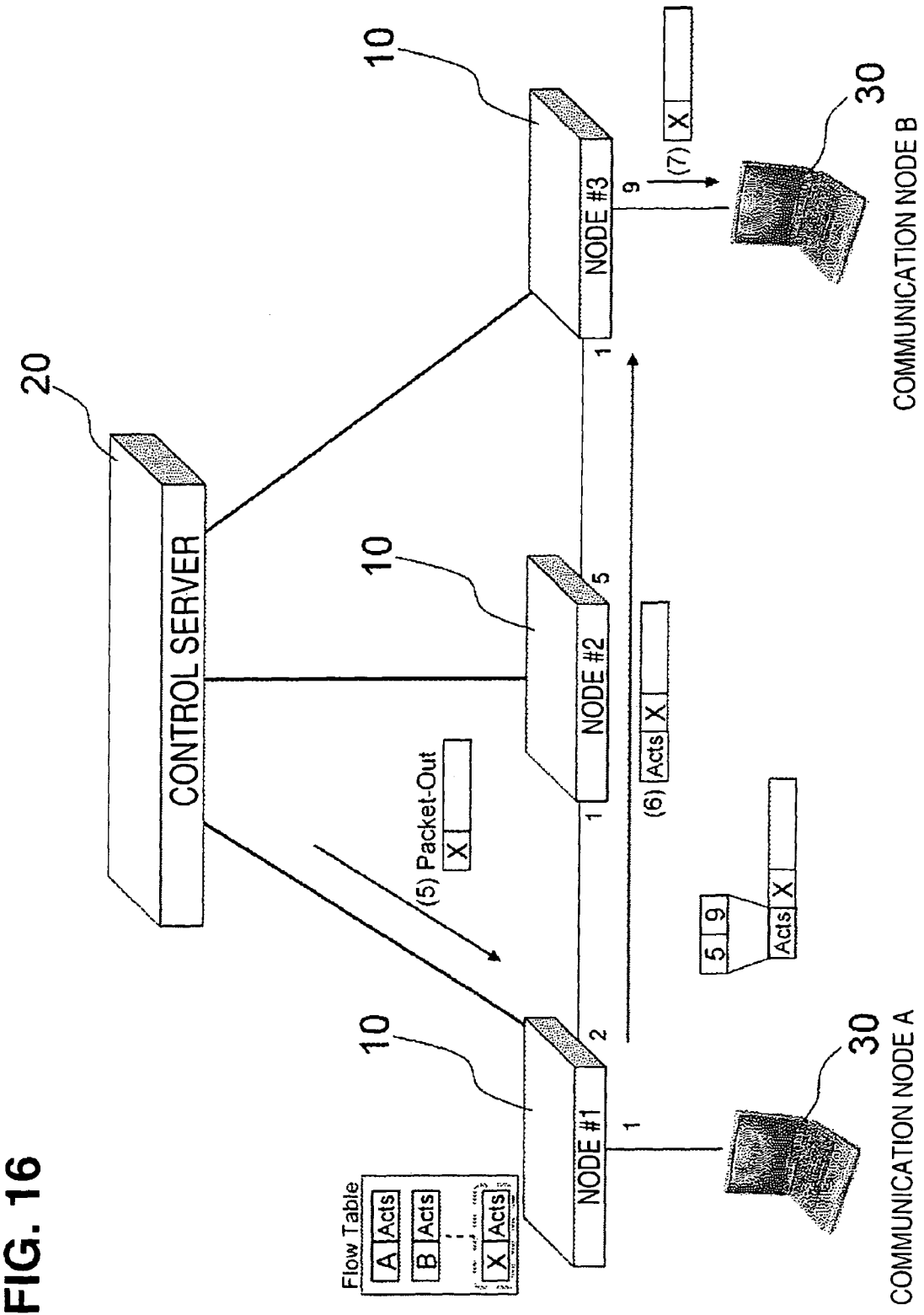
FIG. 16 is a schematic view continuing from FIG. 14.

FIG. 16 shows a state in which the node #1 has registered the flow entry in the flow table. If, in this state, the control server 20 issues a packet output command to the node #1 ((5) Packet-Out of FIG. 16), then the node #1 appends the action header (Acts) to the received packet to forward the resulting packet to a node #2 ((6) of FIG. 16).

The node #2 reads out the action that is contained in the action header (Acts) and that the node #2 itself has to perform. The node #2 outputs the received packet at a port #5. The packet, output at the node #2, is delivered to a node #3.

The node #3 reads out the action that is contained in the action header (Acts) and that the node #3 itself has to perform. The node #3 deletes the action header (Acts) and thereafter outputs the received packet from a port #9. The packet, output from the node #3, is delivered to a communication node B ((7) of FIG. 16).

Figure 17:
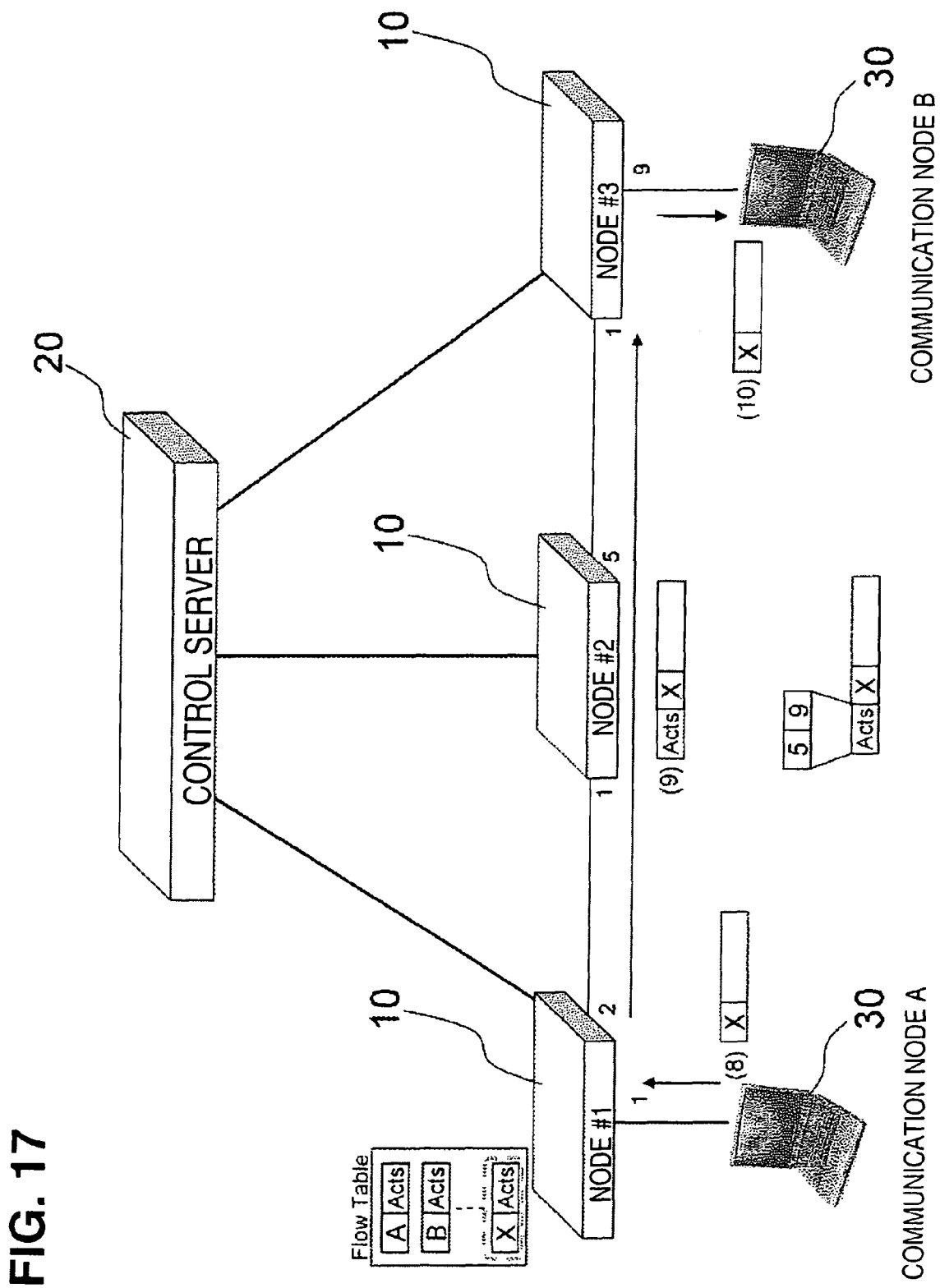
FIG. 17 is a schematic view continuing from FIG. 15.

The communication node A then forwards subsequent packets to the communication node B ((8) of FIG. 17), as shown in FIG. 17. The node #1 that has received the packet looks up a flow entry from its own flow table without inquiring at the control server 20. By so doing, the node #1 creates an action header from the action array of the relevant entry to forward the packet to the node #2 ((9) of FIG. 17). Thereafter, the packet is forwarded from the node #2 to the node #3 and so forth until finally the packet gets to the communication node B ((10) of FIG. 17).

In case the route is long or there is placed a limitation on the length of the action header, it may become necessary to get an action header acquired by an intermediate node. This operation is termed a 'relaying' or 'breath-taking relaying' processing operation. In this case, it is sufficient to have the intermediate node make a request to create an action array ((1) Packet-In of FIG. 18). An action array to be performed by trailing side nodes may be afforded to the intermediate node. By so doing, it is possible to append an action header to the intermediate node.

The node in need of the "breath-taking relaying" may be found by the control server 20 at the time of calculating the route as well as the action array. The breath-taking relaying may be performed not only when the necessity arises, but also by advance forwarding of the flow entry to the node where the necessity for such, processing operation is likely to arise.

Figure 19:
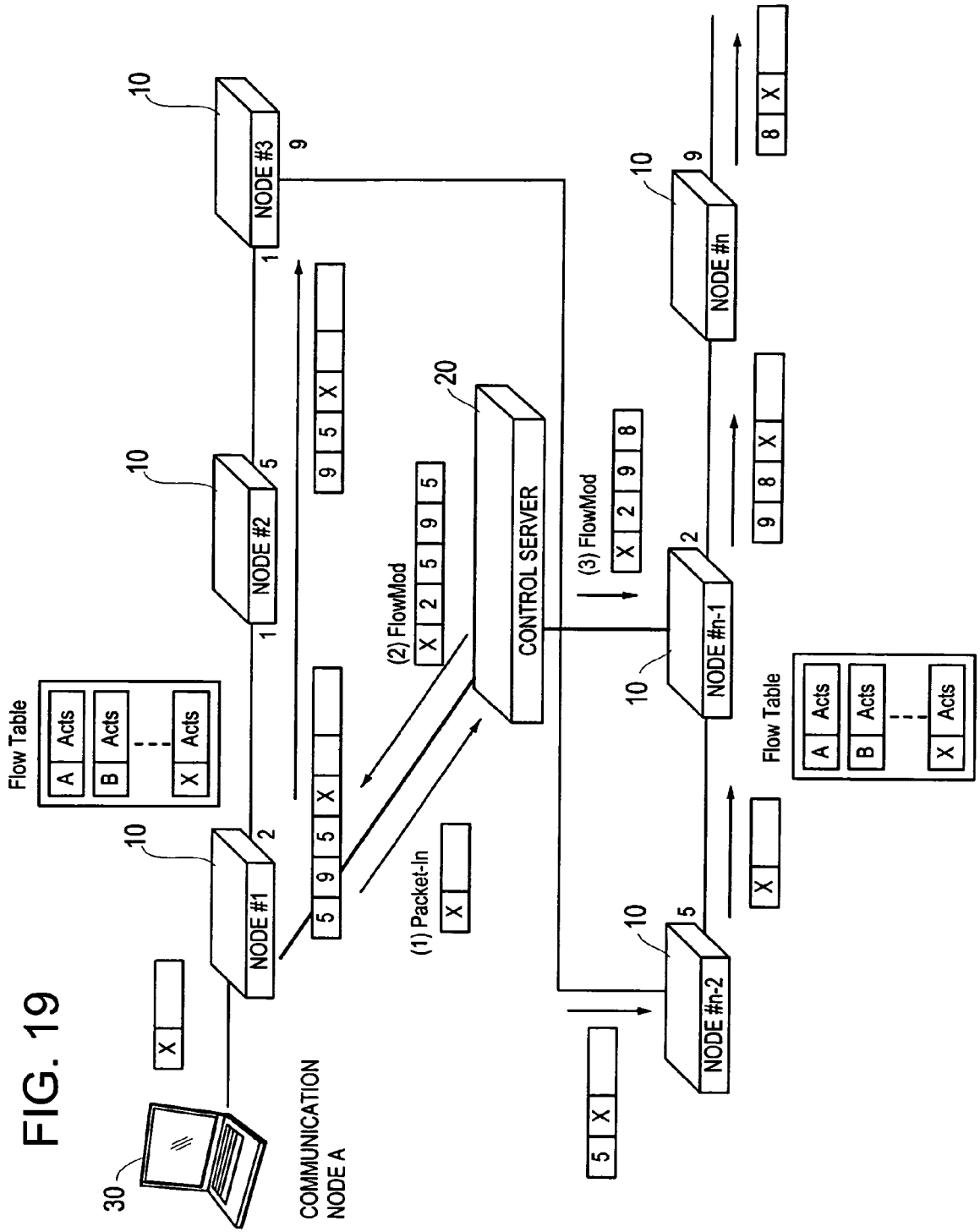
FIG. 19 is a schematic view for illustrating another relaying operation carried out in a node of the exemplary embodiment 1 of the present invention.

It is noted that, when the control server 20 has received the request to create the action array ((1) Packet-In of FIG. 9), the flow entry may be forwarded not only to the node #1 ((2) FlowMod of FIG. 19) but also to the node #n-1 ((3) FlowMod of FIG. 19), as shown in FIG. 19. Note n is natural number.

Exemplary Embodiment 2

Figure 20:
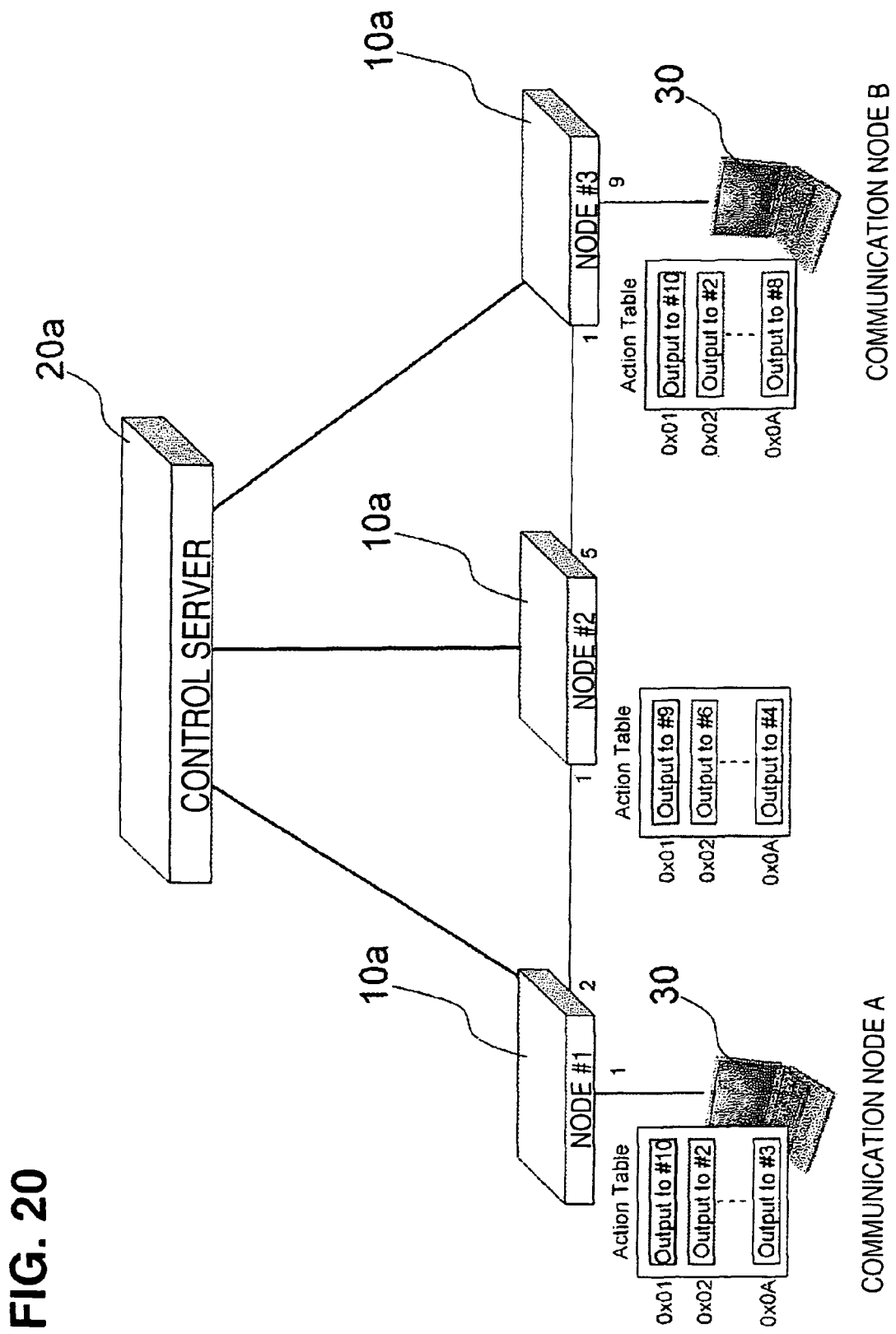
FIG. 20 is a schematic view showing an exemplary embodiment 2 of the present invention.

An exemplary embodiment 2 of the present invention will now be described with reference to the drawings. FIG. 20 shows a communication system according to the exemplary embodiment 2 of the present invention. The present exemplary embodiment differs from the exemplary embodiment 1, shown in FIG. 2, in that each node 10a includes an action table, and in that an action may be identified by pointing to a pointer in the action table.

FIG. 21 shows example flow entries stored in a flow entry DB of a control server 20a of the exemplary embodiment 2 of the present invention. Referring to FIG. 21, each entry is made up of a DPID (data path ID), a FlowKey (a flow key or a matching key), nodes where the actions are to be performed, and pointers to the action table.

Figure 22:
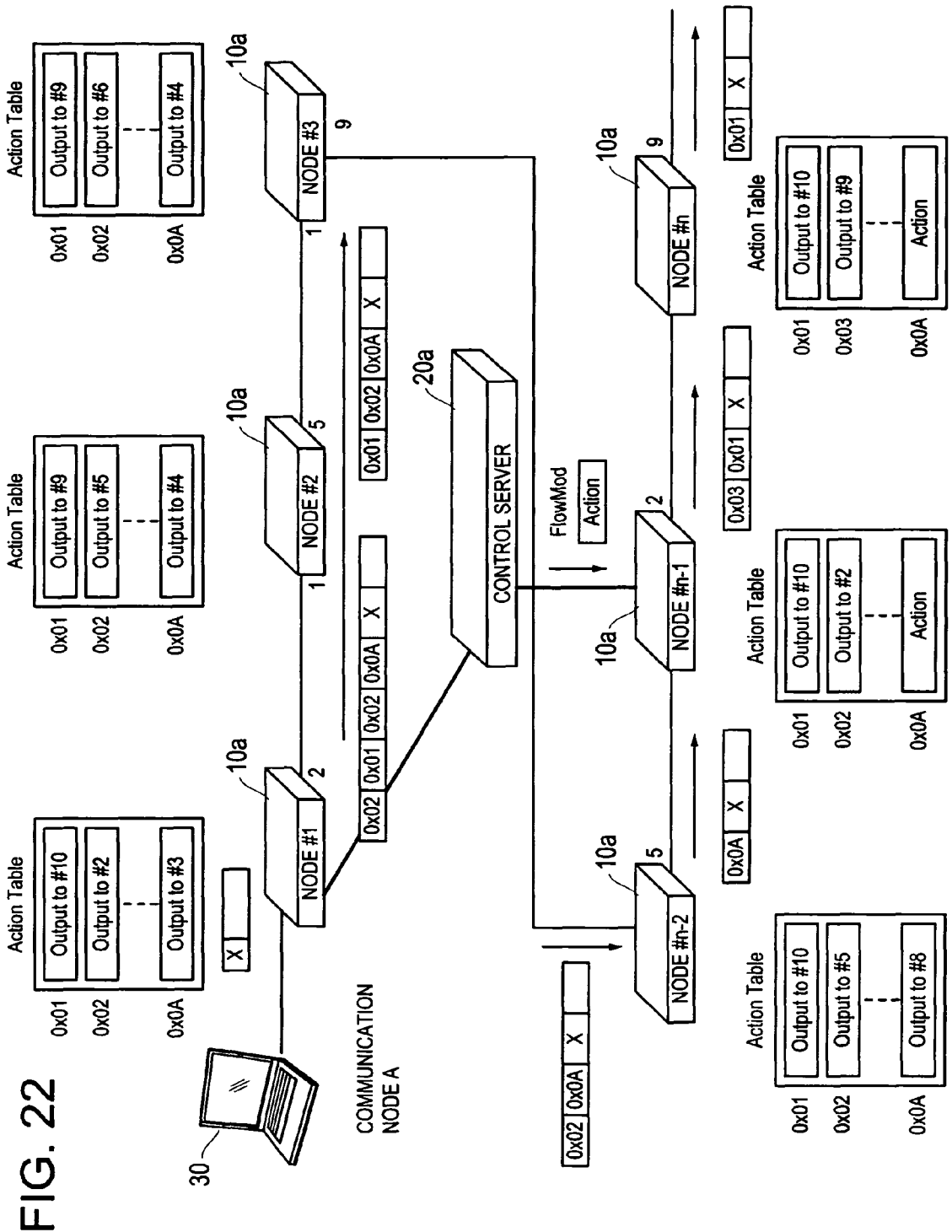
FIG. 22 is a schematic view for illustrating another example relaying operation carried out in a node 10a in the exemplary embodiment 2 of the present invention.

In the present exemplary embodiment, it is possible to increase the size of the action header or the number of actions contained in the action header. In the present exemplary embodiment, it is of course possible to have an intermediate node 10a perform the "breath-taking relaying operation", as shown in FIG. 22. For example, in case it is known at the outset that a node #n-1 of FIG. 22 is in need of the breath-taking relaying operation, the operations needed are as follows: An action that an action header stating an action array to be performed by the trailing side nodes #n and so forth is to be appended to the received packet, and that the resulting packet is sent, is stored in an action table of the node #n-1. It is then sufficient that the action header including a pointer to get the action performed is delivered to the node #n-1.

Exemplary Embodiment 3

Figure 23:
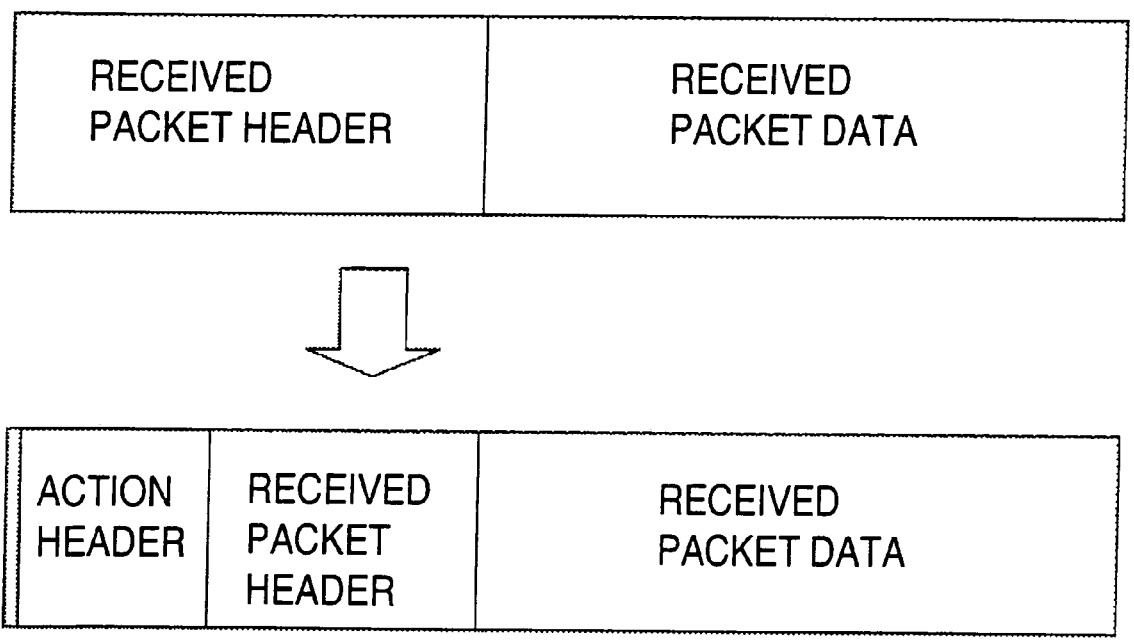
FIG. 23 is a diagrammatic view showing a mode of appending (embedding) an action header (action array) in an exemplary embodiment 3 of the present invention.

An exemplary embodiment 3 of the present invention will now be described in detail with reference to the drawings. In the above exemplary embodiments 2 and 3, the action header is to be appended at the leading end of a received packet (see FIG. 8). It is however possible to rewrite the header of a received packet in part, as shown in FIG. 23.

Figure 24:
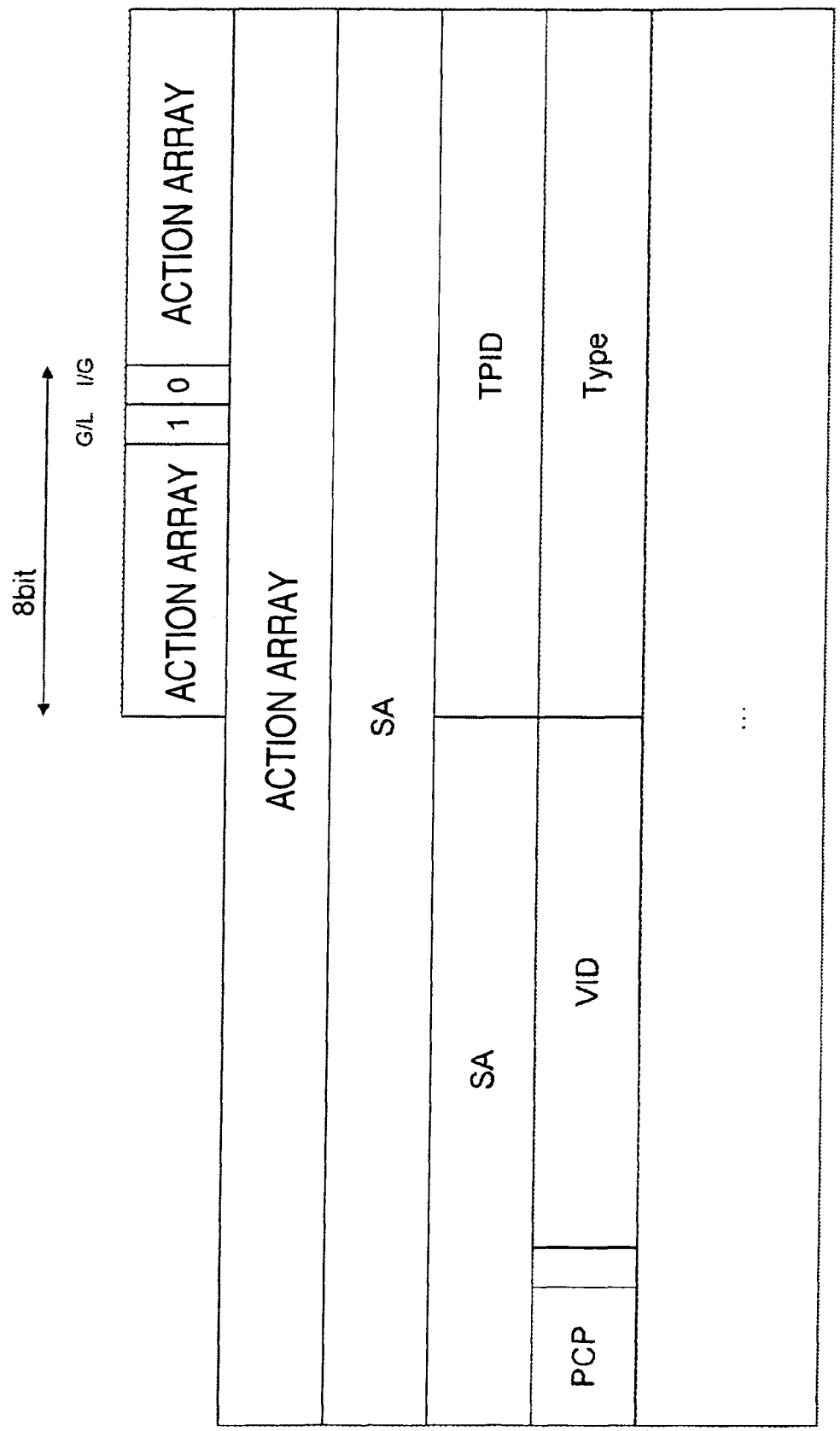
FIG. 24 is a diagrammatic view showing an example frame format having an embedded action header (action array).

FIG. 24 shows a frame format in case an action array is stored in a portion of a MAC DA field of a received packet. It is assumed that 46 bits left after excluding 7th and 8th bits as from the leading end of the MAC DA field (or lower order 2 bits of the first octet) represent a storage area for the action array. In case the number of output ports of each node is 64 at the maximum, the ports may uniquely be identified by 6 bits. Thus, if only ports are arrayed, as shown in FIG. 9A, up to a maximum of seven actions may be accommodated. On the other hand, if the ID of each node is to be appended, as in FIG. 9C, and the length of the ID of each node is 8 bits, three actions at the maximum may be accommodated. Although the MAC DA field is used in the example of FIG. 24, MAC SA or other fields may also be used. In addition, the MAC DA field and the MAC SA field may consecutively be arrayed. In these cases, the number of the actions that may be accommodated may be increased.

Figure 25:
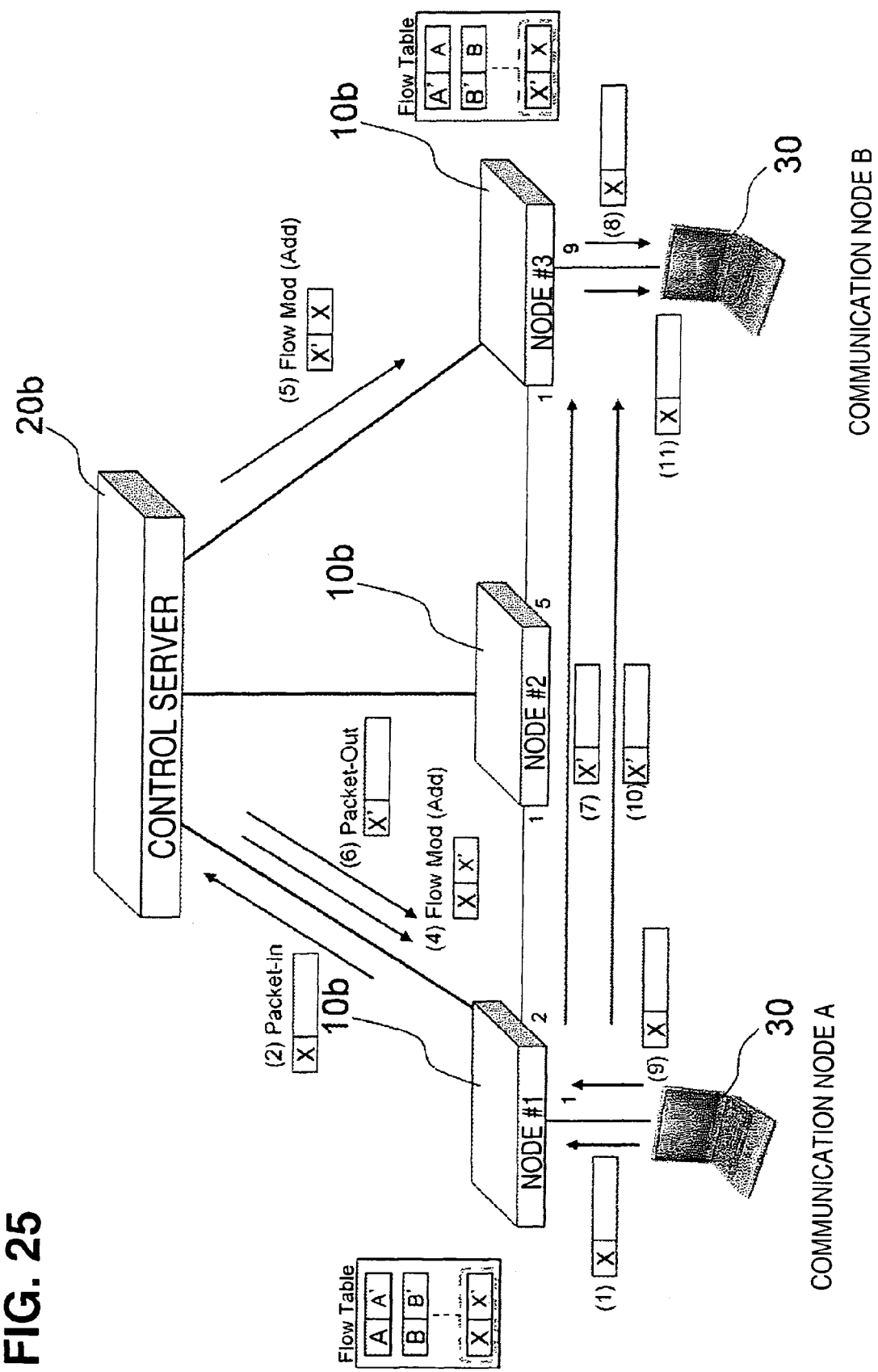
FIG. 25 is a schematic view for illustrating the global operation of the exemplary embodiment 3 of the present invention.

If the action array is embedded using the MAC DA field as described above, then the operation of restoring the MAC DA field becomes necessary to perform in the last hop. Referring to FIG. 25, the operation of the present exemplary embodiment is explained. If a communication node A sends a packet having a header X to a communication node B ((1) of FIG. 25), then a node #1 that has received the packet looks up a flow entry from its own flow table. However, there is no corresponding entry. Hence, the node #1 requests a control server 20b to create an action array coordinated to the packet ((2) Packet-In of FIG. 25).

The control server 20b creates a flow entry that has set an action of substituting a header with an action array (X') for a matching key (X) and the header of the packet sent from the node #1, and returns the so-formed flow entry to the node #1 ((4) FlowMod of FIG. 25). The control server 20b also creates a flow entry that has set an action of first restoring the header with the action array (X') to the original header (X) and subsequently outputting the resulting flow entry at a preset node. The control server 20b then sends the so-formed flow entry to a node #3 which represents the last hop of the route ((5) FlowMod (Add) of FIG. 25).

The control server 20(b) issues a command to the node #1 to output a packet in which the header is the header with an action array (X') ((6) Packet-Out of FIG. 25). The node #1 forwards the received packet to a node #2.

The node #2 reads out the action that is contained in the header with the action array (X') and that the node #2 itself has to perform. The node #2 then outputs the received packet at a port #5. The packet output from the node #2 is delivered to the node #3.

The node #3 takes out the flow entry correlated with the header with the action array (X') and restores the header with the action array (X') to the original header (X). The node #3 outputs the restored packet at the port #9. The packet output at the node #3 is delivered to the communication bode B.

The communication node A then sends subsequent packets to the communication node B, as shown in FIG. 25 ((9) of FIG. 25). The node #1 that has received the packet looks up a flow entry from its own flow table without making an inquiry at the control server 20b. The node #1 sends the packet added with the header with the action array (X') to the node #2 in accordance with the contents of the relevant entry ((10) of FIG. 25). The packet is then forwarded to the node #2 and thence to the node #3 and so forth, until finally the packet gets to the communication node B ((11) of FIG. 25).

With the present exemplary embodiment, described above, the overhead may be reduced by an amount corresponding to the action header as compared to the exemplary embodiment 1.

The present exemplary embodiment may be combined with the exemplary embodiment 2. For example, if a pointer pointing to an action on the action table in each node is used, as shown in FIG. 25, more actions may be accommodated in a sole header. To restore the header in the last hop in such case, it is sufficient that an action to restore the header (X') to the header (X) is stored in the action table of the node #3 and that a pointer (0x05) pointing to the action is specified for the node #3.

Figure 26:
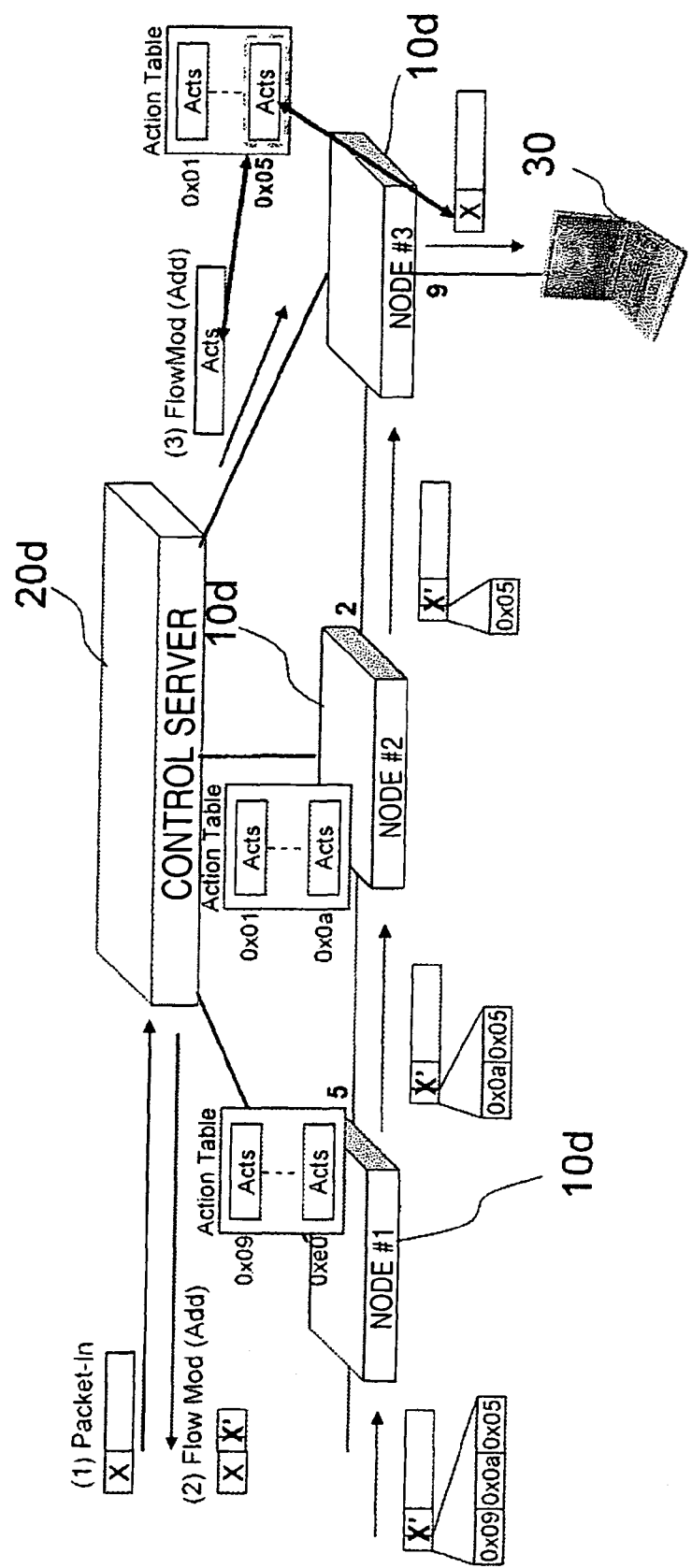
FIG. 26 is a schematic view for illustrating an exemplary embodiment 4 of the present invention.

FIG. 26 is a schematic view for illustrating an exemplary embodiment 4 of the present invention.

Figure 27:
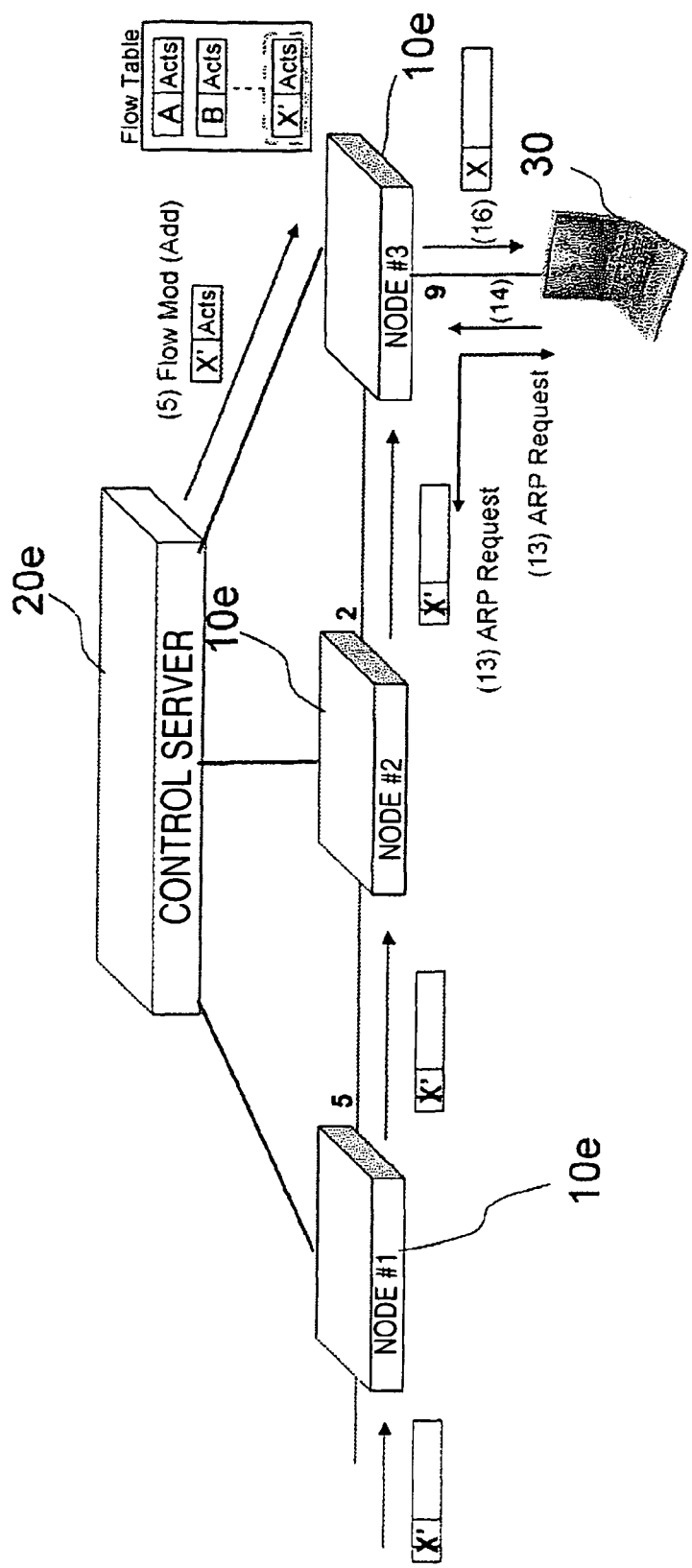
FIG. 27 is a schematic view for illustrating the global operation of an exemplary embodiment 5 of the present invention.

The processing operation for header restoration may be implemented by a variety of methods. For example, a flow entry that allows the next action to be performed may be added to the flow table of the node #3 of the last hop, as shown in FIG. 27. Initially, (12) IP DA (Internet Protocol Destination Address) is acquired from X', and (13) an ARP (Address Resolution Protocol) Request is sent to ports other than In Port. (14) The MAC DA relevant to IP DA is acquired and (15) the header is restored using the MAC DA acquired. Thereafter, (16) the packet is sent to the receiving port of MAC DA.

Figure 28:
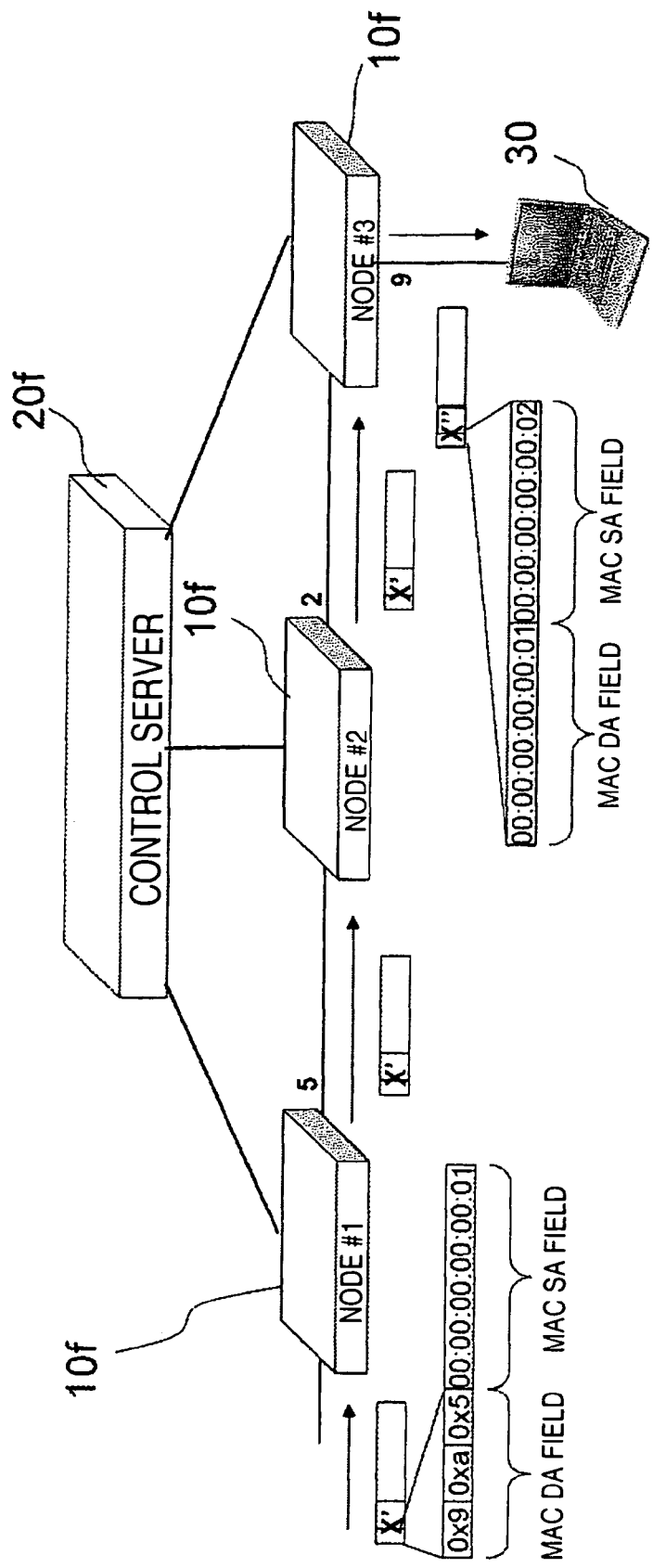
FIG. 28 is a schematic view for illustrating the global operation of an exemplary embodiment 6 of the present invention.

If the MAC SA field is not used to store an action array, then such a method of having the following action performed may be used, as shown in FIG. 28. This action causes the contents of the MAC DA field (00:00:00:00:00:01) to retreat into the MAC SA field, then stores the action array in the MAC DA field and re-writes the MAC DA field back into the node #3 of the last hop using the contents of the MAC SA field. It is noted that, although the address (00:00:00:00:00:02) is entered in the MAC SA field, in the example of FIG. 28, the address may be any other arbitrary value.

The destination of accommodation of the action array is not limited to the example of FIG. 24, such that it may be a MAC SA field, VAN_ID (VID), Type or any other suitable field. The action array may also be accommodated in a preset region, such as header of an upper layer or a data region.

Although exemplary embodiments of the present invention are shown above, the present invention is not limited to these exemplary embodiments and may be modified or adjusted within a range of the fundamental technical concept of the invention. The control servers 20 and 20a to 20f of the exemplary embodiments may be implemented as dedicated servers. The nodes 10 and 10a to 10f may not only be the above mentioned OpenFlow switches, but may also be implemented as MPLS (Multi-Protocol Label Switching) switches in the MPLS networks. The present invention may apply in case the network is such a one that allows a server to perform intensive management of the nodes in the network.

Figure 18:
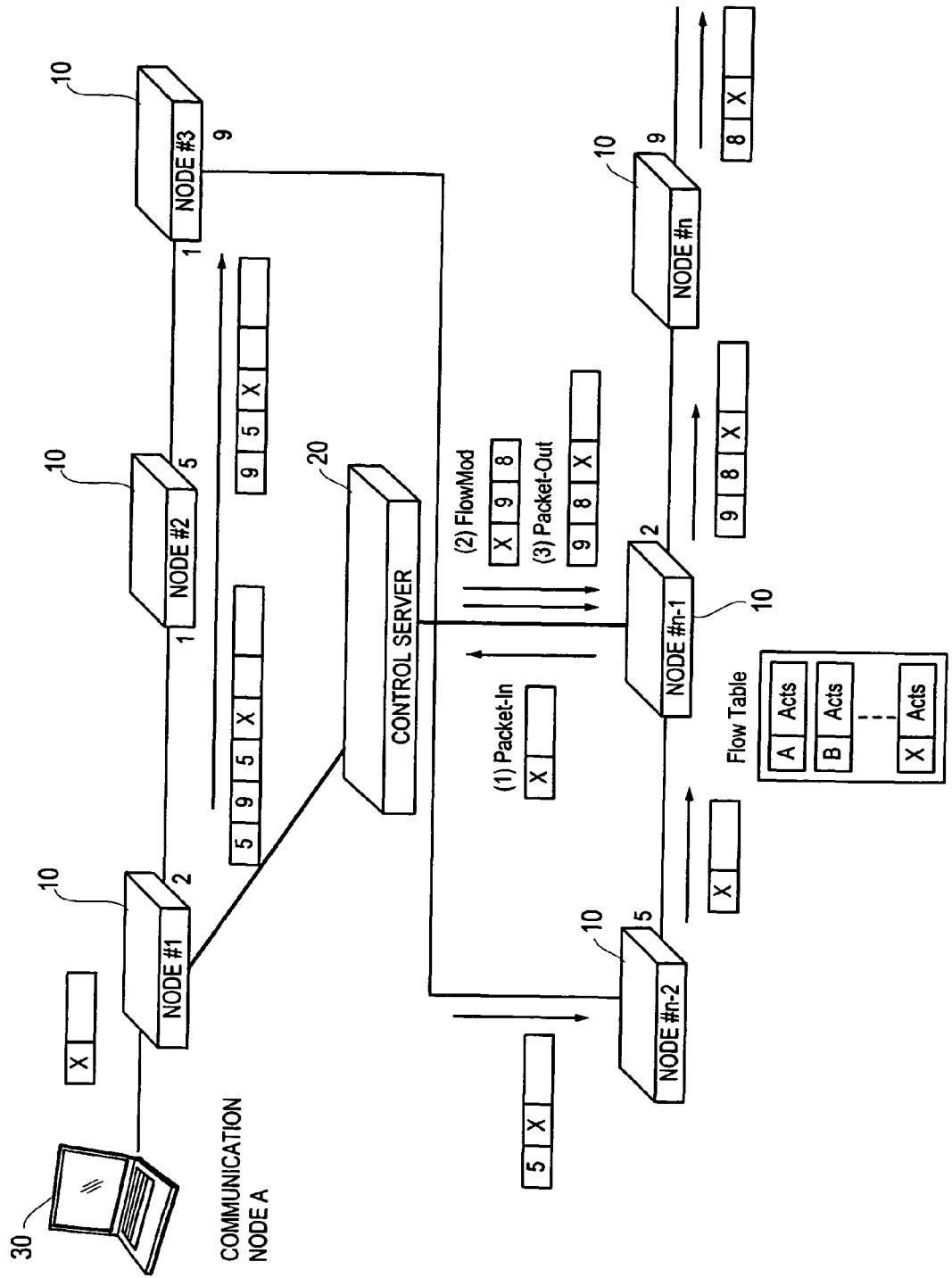
FIG. 18 is a schematic view for illustrating a relaying operation carried out in a node of the exemplary embodiment 1 of the present invention.

As will be apparent from the operation of the present invention, it is sufficient that the action array setting unit 16 is provided as an input node corresponding to the beginning point of the route, such as node #1 of FIG. 18, and as a node for a "breath-taking relaying" operation, such as a node #n-1 of FIG. 18. The action array setting unit 16 may thus be dispensed with if it has been known at the outset which node in the network corresponds to the inlet node or to the node for "breath-taking relay" node.

In the following, exemplary aspects are summarized.

Aspect 1
  A communication system including:
  a node of a data forwarding network;
  the node receiving a packet;
  the packet including an array of processing operations including of a plurality of processing operations to be performed by said node;
  the processing operations being arranged side-by-side;
  the node performing the processing operations the node is to perform in accordance with the array of processing operations.

Aspect 2
  The communication system according to aspect 1, wherein,
  the array of processing operations may include by processing operations to be performed by a plurality of nodes.

Aspect 3
  The communication system according to aspect 1 or 2, wherein,
  the packet further includes data necessary for the processing operations.

Aspect 4
  The communication system according to any one of aspect 1 to 3, further including:
  a node having a setting unit that sets an array of processing operations; the setting unit allowing the array of processing operations to be included in an input packet.

Aspect 5
  The communication system according to aspect 4, wherein,
  if the array of processing operations is not included in the input packet, the setting unit that sets the array of processing operations acquires an array of processing operations based upon the information contained in a header of the input packet to have the array of processing operations included in the input packet.

Aspect 6
  The communication system according to aspect 4, wherein,
  in case the processing operation to be performed by an own node is not included in the array of processing operations of the input packet, the setting unit that sets the array of processing operations acquires an array of processing operations based upon the information included in the header of the input packet to have the array of processing operations included in the input packet.

Aspect 7
  The communication system according to any one of aspects 4 to 6, further including:
  a control server that creates an array of processing operations based upon the information contained in the header of the input packet to send the array of processing operations to a preset node that includes the setting unit that sets the array of processing operations.

Aspect 8
  The communication system according to aspect 7, wherein,
  in case the array of processing operations is not included in the input packet and a relevant array of processing operations is unable to be acquired from the header information of the packet, the setting unit sends the input packet entirely or partially to the control server to request the control server to send the array of processing operations thereto.

Aspect 9
  The communication system according to aspect 8, wherein,
  the control server creates an array of processing operations which allows the node that has requested sending of the array of processing operations to replace the contents of a preset area in the input packet by the array of processing operations to allow a node of the last hop as found from the input packet to restore contents of the preset area of the input packet replaced by the array of processing operations.

Aspect 10
  The communication system according to any one of aspects 7 to 9, wherein,
  the control server allows one or more of nodes other than a node that has requested sending of the array of processing operations to perform the processing operation of requesting the sending of the array of processing operations so the length of the array of the processing operations will be within a preset size.

Aspect 11

The communication system according to any one of aspects 1 to 10, wherein, each of the individual nodes includes a processing table in which contents of the processing operations are registered;

the array of processing operations being stated by a pointer identifying the contents of the processing operations registered in the processing table.

Aspect 12

The communication system according to any one of aspects 1 to 11, wherein, the node has the function of updating the array of processing operations contained in the input packet after performing at least one processing operation contained in the array of processing operations.

Aspect 13

The communication system according to any one of aspects 1 to 12, wherein, the processing operations in the array of processing operations are arrayed in the order of the nodes that perform the processing operations; the packet being forwarded to individual nodes in accordance with said array of processing operations.

Aspect 14

The communication system according to any one of aspects 1 to 12, wherein, the processing operations in the array of processing operations are arrayed in association with the nodes that perform the processing operations; the individual nodes extracting the processing operations correlated with own node(s) from the array of processing operations and performing the processing operations extracted.

Aspect 15

A node arranged in a data forwarding network;

the node arranged in the data forwarding network receiving a packet containing an array of processing operations the node is to perform;

the processing operations being arranged side-by-side;

the node arranged in the data forwarding network performing the processing operation in accordance with the array of processing operations.

Aspect 16

The node according to aspect 15, wherein, the array of processing operations includes of processing operations to be performed by a plurality of nodes.

Aspect 17

The node according to aspect 16, wherein, the packet further includes data necessary for said processing operations.

Aspect 18

The node according to any one of aspects 15 to 17, further including:

a setting unit that sets an array of processing operations; the setting unit allowing the array of processing operations to be contained in an input packet.

Aspect 19

The node according to aspect 18, wherein, in case said array of processing operations is not contained in the input packet, the setting unit acquires the array of processing operations based upon information contained in a header of the input packet to have the array of processing operations included in the input packet.

Aspect 20

The node according to aspect 19, wherein, in case the processing operation to be performed by an own node is not contained in the array of processing operations of the input packet, the setting unit acquires the array of processing operations based upon the information contained in the header of the input packet to have the array of processing operations included in the input packet.

Aspect 21

The node according to aspect 20, wherein, in case the array of processing operations is not contained in an input packet and a relevant array of processing operations is unable to be acquired from header information of the packet, the setting unit sends all or part of the input packet to a control server that sends the array of processing operations to request the control server to send the array of processing operations thereto.

Aspect 22

The node according to any one of aspects 15 to 21, further including:

a processing table having registered therein contents of processing operations; wherein, the contents of processing operations registered in the processing table are identified by pointers; the array of processing operations is stated by the pointers; the pointers being read out to perform the contents of the processing operations associated with the pointers.

Aspect 23

The node according to any one of aspects 15 to 22, wherein, the node has a function of performing one or more processing operations contained in the array of processing operations and thereafter updating the array of processing operations contained in the input packet.

Aspect 24

A control server that creates an array of processing operations composed of processing operations to be performed by a node arranged in the data forwarding network, based upon information contained in an input packet received from a node arranged in the data forwarding network;

the processing operations being arrayed side-by-side;

the control server sending the array of processing operations to the node that has sent the input packet.

Aspect 25

The control server according to aspect 24, wherein, the array of processing operations includes processing operations to be performed by a plurality of nodes.

Aspect 26

The control server according to aspects 24 or 25, wherein, the packet further includes data necessary for the processing operations.

Aspect 27

The control server according to any one of aspects 24 to 26, wherein, such an array of processing operations is created that allows the node which has sent the array of processing operations to replace contents a preset area of the input packet by the array of processing operations and that allows a node of the last hop as found from the input packet to restore the contents of the preset area of the input packet replaced by the array of the processing operations.

Aspect 28

The control server according to any one of aspects 24 to 27, wherein, the control server allows one or more nodes other than the node that has sent the array of processing operations to perform the processing operation of requesting the sending of the array of processing operations so that length of the array of processing operations will not be larger than a preset value.

Aspect 29

The control server according to any one of aspects 24 to 28, wherein, such array of processing operations is created in which the processing operations are arrayed in the order of nodes that perform the processing operations and in which a packet is forwarded to the individual nodes in accordance with the array of processing operations.

Aspect 30

The control server according to any one of aspects 24 to 28, wherein, such array of processing operations is created in which the nodes that perform the processing operations and the processing operations are stated correlated with each other and in which individual nodes are able to extract the processing operations associated with own node(s) from the array of the processing operations to perform the processing operations extracted.

Aspect 31

A method for communication including:

having an array of processing operations contained in an input packet; the array of processing operations being an array of processing operations to be performed by a node in a data forwarding network; the processing operations being arrayed side-by-side; and a node in the data forwarding network performing the processing the node itself is to perform in accordance with the array of processing operations contained in the input packet.

Aspect 32

A program, tangibly embodied in a machine-readable storage medium, to be run on a computer that composes a node arranged in a data forwarding network; wherein the program allows receiving a packet containing an array of processing operations to be performed by the node arranged in the data forwarding network; the processing operations being arrayed side-by-side;

the program allows the processing operation to be performed by an own node in accordance with the array of processing operations; and wherein the program allows a processing operation(s) extracted to be performed.

Aspect 33

A program to be run on a computer, as tangibly embodied in a machine-readable medium, that composes a control server which creates an array of processing operations in response to a request from a node arranged in a data forwarding network;

the program allowing a processing operation(s) of creating the array of processing operations to be performed by a node in the data forwarding network, based upon information contained in a header of an input packet received from the node; and a processing operation of sending the array of processing operations created to the node.

The particular exemplary embodiments or examples may be modified or adjusted within the range of the entire disclosure of the present invention, inclusive of claims, based upon the fundamental technical concept of the invention. Further, a variety of combinations or selection of elements disclosed herein may be made within the framework of the claims.

INDUSTRIAL UTILIZABILITY

In a commercial network, such as datacenter, it is necessary to precisely control the packet forwarding route under variable conditions, including a destination address, source address or protocols to be in use, in order to obtain high QoS (Quality of Service) and in order to effect optimum load distribution. According to the present invention, at least the flow table of a node not in need of intermediate breath-taking relay processing may be dispensed with. In addition, even in a node in need of a flow table, it becomes possible to reduce the number of entries. The invention may thus be used to advantage for a commercial network, such as data center.

While the invention has been described in terms of several exemplary embodiments, those skilled in the art will recognize that the invention can be practiced with modification within the spirit and scope of the appended claims.

Further, it is noted that Applicant's intent is to encompass equivalents of all claim elements, even if amended later during prosecution.

What is claimed is:

1. A control server, comprising:
a first unit to determine a route for transferring a packet, wherein the determined route comprises a plurality of nodes;
a second unit to determine a plurality of packet handling operations to be respectively executed by the nodes along the determined route; and
a third unit to instruct at least one node of the plurality of nodes along the determined route to insert information corresponding to the packet handling operations into the packet to be transferred on the determined route, the information of packet handling operations inserted into the packet so that the information of packet handling operations comprise an array, an array position permitting nodes along the determined route to identify which of the packet handling operations in the packet are respectively assigned to that node.

* * * * *